(12) United States Patent
Kozakai et al.

(10) Patent No.: US 10,320,062 B2
(45) Date of Patent: Jun. 11, 2019

(54) MOUNTING BASE, COMMUNICATION DEVICE, ANTENNA CHARACTERISTIC CORRECTION MEMBER, AND COMMUNICATION SYSTEM

(71) Applicant: SONY CORPORATION, Tokyo (JP)

(72) Inventors: Osamu Kozakai, Kanagawa (JP);
Takayuki Hirabayashi, Tokyo (JP);
Rikiya Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 189 days.

(21) Appl. No.: 15/320,845

(22) PCT Filed: Apr. 13, 2015

(86) PCT No.: PCT/JP2015/061390
§ 371 (c)(1),
(2) Date: Dec. 21, 2016

(87) PCT Pub. No.: WO2016/006295
PCT Pub. Date: Jan. 14, 2016

(65) Prior Publication Data
US 2017/0162934 A1    Jun. 8, 2017

(30) Foreign Application Priority Data
Jul. 7, 2014    (JP) .................................. 2014-139485

(51) Int. Cl.
*H01Q 1/27* (2006.01)
*H01Q 1/24* (2006.01)
(Continued)

(52) U.S. Cl.
CPC .............. *H01Q 1/273* (2013.01); *H01Q 1/245* (2013.01); *H01Q 9/0485* (2013.01);
(Continued)

(58) Field of Classification Search
CPC ............ H01Q 1/273; H02J 7/00; H04B 1/385
See application file for complete search history.

(56) References Cited

U.S. PATENT DOCUMENTS

| | | | | |
|---|---|---|---|---|
| 8,328,055 | B1 * | 12/2012 | Snyder | ...................... A45F 5/00 |
| | | | | 224/197 |
| 2004/0137937 | A1 * | 7/2004 | Oesch | .................... H01Q 1/273 |
| | | | | 455/550.1 |

(Continued)

FOREIGN PATENT DOCUMENTS

| | | |
|---|---|---|
| JP | 08-335969 A | 12/1996 |
| JP | 11-186824 A | 7/1999 |

(Continued)

*Primary Examiner* — Dameon E Levi
*Assistant Examiner* — Jennifer F Hu
(74) *Attorney, Agent, or Firm* — XSensus LLP

(57) ABSTRACT

[Object] To optimize the antenna characteristic both when worn on the human body and when separated from the human body. [Solution] A mounting base includes a mounting portion on which a communication device including an antenna and being worn on a human body is mounted or held such that the communication device comes into contact with or comes close to the mounting portion and a correcting unit installed in the mounting portion and configured to correct an antenna characteristic of the antenna of the communication device mounted or held on the mounting portion.

23 Claims, 32 Drawing Sheets

(51) Int. Cl.
  *H01Q 9/04*    (2006.01)
  *H04B 1/034*   (2006.01)
  *H04B 1/3827*  (2015.01)
  H04B 1/3877    (2015.01)
  H01Q 19/06     (2006.01)

(52) U.S. Cl.
  CPC ........... H04B 1/0343 (2013.01); H04B 1/385 (2013.01); *H01Q 19/06* (2013.01); *H04B 1/3877* (2013.01); *H04B 2001/3855* (2013.01); *H04B 2001/3861* (2013.01)

(56) References Cited

U.S. PATENT DOCUMENTS

2009/0046020 A1* 2/2009 Kato .................. H01Q 1/243
                                                  343/702
2013/0157586 A1* 6/2013 Saito .................. H04B 1/40
                                                  455/73
2014/0285385 A1* 9/2014 Aoki .................. H01Q 1/243
                                                  343/702
2016/0013543 A1* 1/2016 Nguyen ................ H01Q 1/243
                                                  343/702

FOREIGN PATENT DOCUMENTS

| JP | 2005-086939 A | 3/2005 |
| JP | 2009-278173 A | 11/2009 |
| JP | 2013-215038 A | 10/2013 |

* cited by examiner

FIG. 6

| FREQUENCY (MHz) | TEMPORAL PART OF HUMAN BODY | | PART OTHER THAN TEMPORAL PART OF HUMAN BODY | |
|---|---|---|---|---|
| | REAL PART $\varepsilon'$ OF RELATIVE PERMITTIVITY | PERMITTIVITY $\sigma$ (S/m) | REAL PART $\varepsilon'$ OF RELATIVE PERMITTIVITY | PERMITTIVITY $\sigma$ (S/m) |
| 30 | NOT SPECIFIED | NOT SPECIFIED | 55.0 | 0.75 |
| 150 | NOT SPECIFIED | NOT SPECIFIED | 52.3 | 0.76 |
| 300 | 45.3 | 0.87 | 45.3 | 0.87 |
| 450 | 43.5 | 0.87 | 43.5 | 0.87 |
| 750 | NOT SPECIFIED | NOT SPECIFIED | 41.9 | 0.89 |
| 835 | 41.5 | 0.90 | 41.5 | 0.90 |
| 900 | 41.5 | 0.97 | 41.5 | 0.97 |
| 1450 | 40.5 | 1.20 | 40.5 | 1.20 |
| 1800 | 40.0 | 1.40 | 40.0 | 1.40 |
| 1900 | 40.0 | 1.40 | 40.0 | 1.40 |
| 1950 | 40.0 | 1.40 | 40.0 | 1.40 |
| 2000 | 40.0 | 1.40 | 40.0 | 1.40 |
| 2100 | NOT SPECIFIED | NOT SPECIFIED | 39.8 | 1.49 |
| 2450 | 39.2 | 1.80 | 39.2 | 1.80 |
| 2600 | NOT SPECIFIED | NOT SPECIFIED | 39.0 | 1.96 |
| 3000 | 38.5 | 2.40 | 38.5 | 2.40 |
| 3500 | NOT SPECIFIED | NOT SPECIFIED | 37.9 | 2.91 |
| 4000 | NOT SPECIFIED | NOT SPECIFIED | 37.4 | 3.43 |
| 4500 | NOT SPECIFIED | NOT SPECIFIED | 36.8 | 3.94 |
| 5000 | NOT SPECIFIED | NOT SPECIFIED | 36.2 | 4.45 |
| 5200 | NOT SPECIFIED | NOT SPECIFIED | 36.0 | 4.66 |
| 5400 | NOT SPECIFIED | NOT SPECIFIED | 35.8 | 4.86 |
| 5600 | NOT SPECIFIED | NOT SPECIFIED | 35.5 | 5.07 |
| 5800 | NOT SPECIFIED | NOT SPECIFIED | 35.3 | 5.27 |
| 6000 | NOT SPECIFIED | NOT SPECIFIED | 35.1 | 5.48 |

MOUNTING BASE, COMMUNICATION DEVICE, ANTENNA CHARACTERISTIC CORRECTION MEMBER, AND COMMUNICATION SYSTEM

CROSS REFERENCE TO RELATED APPLICATIONS

This application is a U.S. National Phase of International Patent Application No. PCT/JP2015/061390 filed on Apr. 13, 2015, which claims priority benefit of Japanese Patent Application No. JP 2014-139485 filed in the Japan Patent Office on Jul. 7, 2014. Each of the above-referenced applications is hereby incorporated herein by reference in its entirety.

TECHNICAL FIELD

The present disclosure relates to a mounting base, a communication device, an antenna characteristic correction member, and a communication system.

BACKGROUND ART

In recent years, communication devices capable of performing communication via a wireless transmission path such as smart phones have been reduced in size, and usage patterns thereof have become diverse. For this reason, communication devices configured as so-called wearable devices that can be worn on a body of a user and used have spread.

CITATION LIST

Patent Literature

Patent Literature 1: JP 2009-278173A
Patent Literature 2: JP H11-186824A

SUMMARY OF INVENTION

Technical Problem

Meanwhile, when a human body is positioned around an antenna of a wireless device, there are cases in which an antenna characteristic of the antenna changes due to influence of the human body. Particularly, in a communication device that can be worn on the body of the user (that is, the human body) and used such as a wearable device, as the communication device is worn on the human body, and so an antenna of an internal wireless device and the human body come closer to each other, the antenna is more likely to be influenced by the human body.

There are cases in which the communication device that can be worn on the human body and used performs wireless communication even in a state in which it is separated from the human body, for example, when it is placed on a charging stand. Under such circumstances, the state in which it is worn on the human body and the state in which it is separated from the human body differ in the antenna characteristic. For this reason, although the antenna characteristic of the antenna is adjusted according to any one state, there are cases in which in another state, the antenna characteristic deteriorates, or performance of the antenna or the wireless device is not sufficiently used.

In this regard, the present disclosure proposes a mounting base, a communication device, an antenna characteristic correction member, and a communication system, which are capable of optimizing the antenna characteristic both when worn on the human body and when separated from the human body.

Solution to Problem

According to the present disclosure, there is provided a mounting base including: a mounting portion on which a communication device is mounted or held in a manner that the communication device comes into contact with or comes close to the mounting portion, the communication device including an antenna and being worn on a human body; and a correcting unit configured to correct an antenna characteristic of the antenna of the communication device that is installed in the mounting portion and that is mounted or held on the mounting portion.

According to the present disclosure, there is provided a communication device including: a device body configured to include an antenna; and a wearing portion configured to cause the device body to be worn on a human body. When the device body is mounted or held on a mounting base that includes the mounting portion and that is provided with a correcting unit configured to correct an antenna characteristic of the antenna, a contact portion that comes into contact with the human body or an approach portion that comes close to the human body at a time of wearing on the human body comes into contact with or comes close to the mounting portion.

There is provided an antenna characteristic correction member including: a correcting unit configured to correct an antenna characteristic of a communication device that includes an antenna and is worn on a human body; and a holding portion configured to hold the correcting unit on an object in a manner that the correcting unit and the communication device mounted or held on the object comes into contact with or comes close to each other.

Further, according to the present disclosure, provided is a communication system including a communication device including a device body configured to include an antenna and a wearing portion configured to cause the device body to be worn on a human body and a mounting base including a mounting portion on which the communication device is mounted or held such that the communication device comes into contact with or comes close to the mounting portion and a correcting unit installed in the mounting portion and configured to correct an antenna characteristic of the antenna of the communication device mounted or held on the mounting portion.

Advantageous Effects of Invention

As described above, according to the present disclosure, a mounting base, a communication device, an antenna characteristic correction member, and a communication system, which are capable of optimizing the antenna characteristic both when worn on the human body and when separated from the human body are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 illustrates electrical characteristic of a dielectric included in a correcting unit.

DESCRIPTION OF EMBODIMENT(S)

Figure 1:
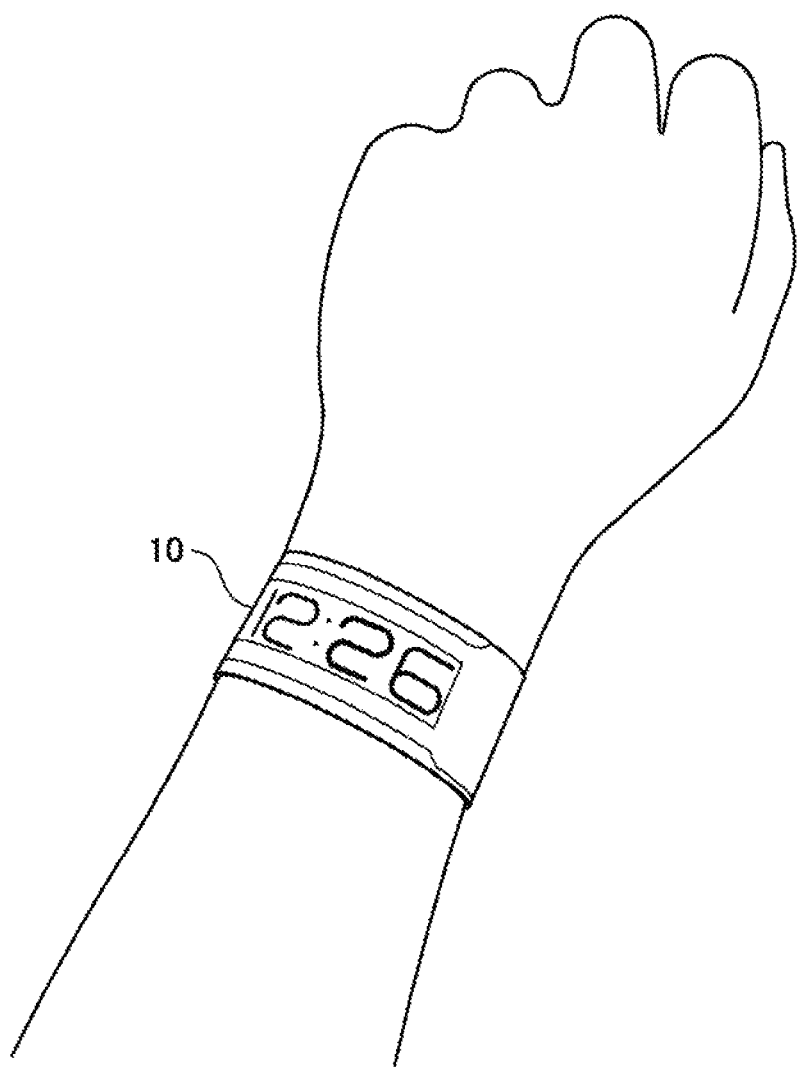
FIG. 1 is an explanatory diagram for describing an overview of a communication device according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1.1. First embodiment
1.1. Overview
1.2. Configuration
1.3. Example 1-1
1.4. Modified example 1
1.5. Conclusion
2. Second Embodiment
2.1. Overview
2.2. Functional configuration
2.3. Process
2.4. Modified examples
2.4.1. Modified example 2-1
2.4.2. Modified example 2-2
2.5. Conclusion
3. Third Embodiment
3.1. Overview
3.2. Configuration
3.3. Conclusion
4. Fourth Embodiment
4.1. Configuration
4.2. Modified examples
4.2.1. Modified example 4-1
4.2.2. Modified example 4-2

4.3. Conclusion

5. Conclusion

1. First Embodiment

1.1. Overview

First, a overview of a communication device and a mounting base according to a first embodiment of the present disclosure will be described with reference to FIGS. 1 and 2. FIG. 1 is an explanatory diagram for describing an overview of a communication device 10 according to the present embodiment. As illustrated in FIG. 1, the communication device 10 according to the present embodiment is configured as a so-called wearable device that can be worn on the body of the user (that is, the human body) and used. In the example illustrated in FIG. 1, the communication device 10 is configured as a so-called wristwatch type wearable device that is worn on the wrist of the user and used. The communication device 10 according to the present embodiment includes an antenna and a communication apparatus for performing communication via a wireless transmission path.

Figure 2:
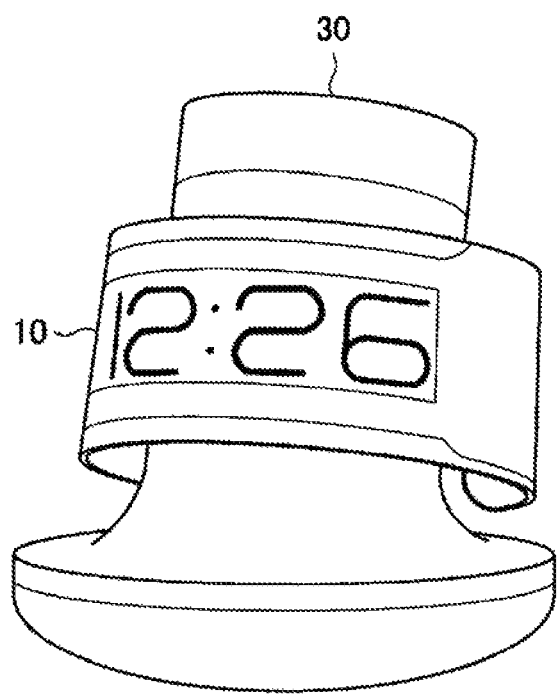
FIG. 2 is an explanatory diagram for describing an overview of a communication device and a mounting base according to the embodiment.

FIG. 2 is an explanatory diagram for describing an overview of the communication device 10 according to the present embodiment and a mounting base 30 on which the communication device 10 is mounted or held. As illustrated in FIG. 2, the mounting base 30 is configured to be able to mounting or holding the communication device 10 at a predetermined position of the mounting base 30. As a specific example of the mounting base 30, there is a charging stand for charging a battery (not illustrated) installed in the communication device 10 and supplying the communication device 10 (eventually, the battery) with electric power.

The communication device 10 according to the present embodiment is configured to be able to perform wireless communication in any of a state in which the communication device 10 is worn on the body of the user as illustrated in FIG. 1 and a state in which the communication device 10 is not worn on the body of the user as illustrated in FIG. 2.

Meanwhile, when the human body is positioned around the antenna of the wireless device, there are cases in which the antenna characteristic of the antenna changes due to influence of the human body. It is because the human body is a sort of conductor, and the human body adjacent to the antenna influences the antenna as a so-called parasitic capacitor.

Specifically, as the human body adjacent to the antenna has influence as the parasitic capacitor, the impedance characteristic of the antenna changes, and a resonance condition of the antenna changes with the change in the impedance characteristic. The change in the resonance condition by the influence of the human body comes to the surface as a change in the antenna characteristic of the antenna (particularly, a frequency characteristic). As a specific example, when the antenna and the human body come close to each other, the frequency characteristic of the antenna tends to shift to a low frequency side.

There are cases in which the change in the antenna characteristic comes to the surface as a change in transmission power of the antenna. As a specific example, when the communication device is not worn on the human body, the antenna characteristic of the antenna is assumed to have been adjusted so that the transmission power of the antenna is further increased in the frequency band used for communication. When the communication device is worn on the human body, there are cases in which due to the change in the antenna characteristic associated with wearing on the human body, the proportion of the reflective wave in the frequency band used for communication is increased, and an output of a signal output from then antenna to the outside (that is, the transmission power of the antenna) is lowered.

Meanwhile, there is a method of anticipating influence of the human body and adjusting the antenna characteristic of the antenna in advance so that the transmission power of the antenna in a frequency band used for communication is further increased when the communication device is worn on the human body. However, in this case, when the communication device is not worn on the human body, for example, when the communication device is mounted on the charging stand, the frequency characteristic of the antenna shifts to a higher frequency side (that is, the antenna characteristic changes) than when the communication device is worn on the human body. In other words, there are cases in which due to the change in the antenna characteristic, the transmission power of the antenna is reduced (that is, the antenna characteristic deteriorates). Hereinafter, when (a state in which) the communication device 10 is worn on the human body is also referred to as "at the time of wearing on the human body." Similarly, when (a state in which) the communication device 10 is not worn on the human body is also referred to as "at the time of non-wearing on the human body."

As described above, in the communication device that can be worn on the human body and used, there are cases in which although the antenna characteristic is adjusted so that the transmission power of the antenna is further increased in one of the two states, that is, at the time of wearing on the human body and at the time of non-wearing on the human body, the antenna characteristic deteriorates in the other state.

In this regard, in the present embodiment, a mechanism capable of optimizing the antenna characteristic of the antenna through which the communication device 10 performs wireless communication (that is, a mechanism capable of preventing deterioration in the antenna characteristic) both at the time of wearing on the human body and at the time of non-wearing on the human body is provided.

Specifically, in an antenna of the communication device 10 according to the present embodiment illustrated in FIGS. 1 and 2, the antenna characteristic is optimized in advance so that the transmission power is further increased when the communication device 10 is worn on the human body. A mounting base 30 illustrated in FIG. 2 is provided with a correcting unit that corrects the antenna characteristic of the antenna of the communication device 10 mounted or held on the mounting base 30. At this time, the correcting unit corrects the frequency characteristic of the antenna of the communication device 10 shifted to the higher frequency side than at the time of wearing on the human body as it is removed from the human body so that the frequency characteristic of the antenna of the communication device 10 becomes equal to that at the time of wearing on the human body (that is, shifts to the low frequency side).

Through this configuration, even when the communication device 10 is mounted or held on the mounting base 30, the antenna characteristic of the communication device 10 is corrected so that the transmission power is further increased, similarly to the time of wearing on the human body.

In other words, in the communication system including the communication device 10 and the mounting base 30 according to the present embodiment, the antenna characteristic of the antenna of the communication device 10 is optimized in any of the state in which the communication device 10 is worn on the human body and the state in which the communication device 10 is not worn on the human body (that is, the state in which the communication device 10 is mounted or held on the mounting base 30). For this reason, according to the communication system according to the present embodiment, performance of a device (that is, the antenna or the wireless device) used when the communication device 10 performs wireless communication can be sufficiently used both at the time of wearing on the human body and at the time of non-wearing on the human body. In this regard, hereinafter, the communication system (that is, the communication device 10 and the mounting base 30) according to the present embodiment will be described in further detail.

1.2. Configuration

Figure 3:
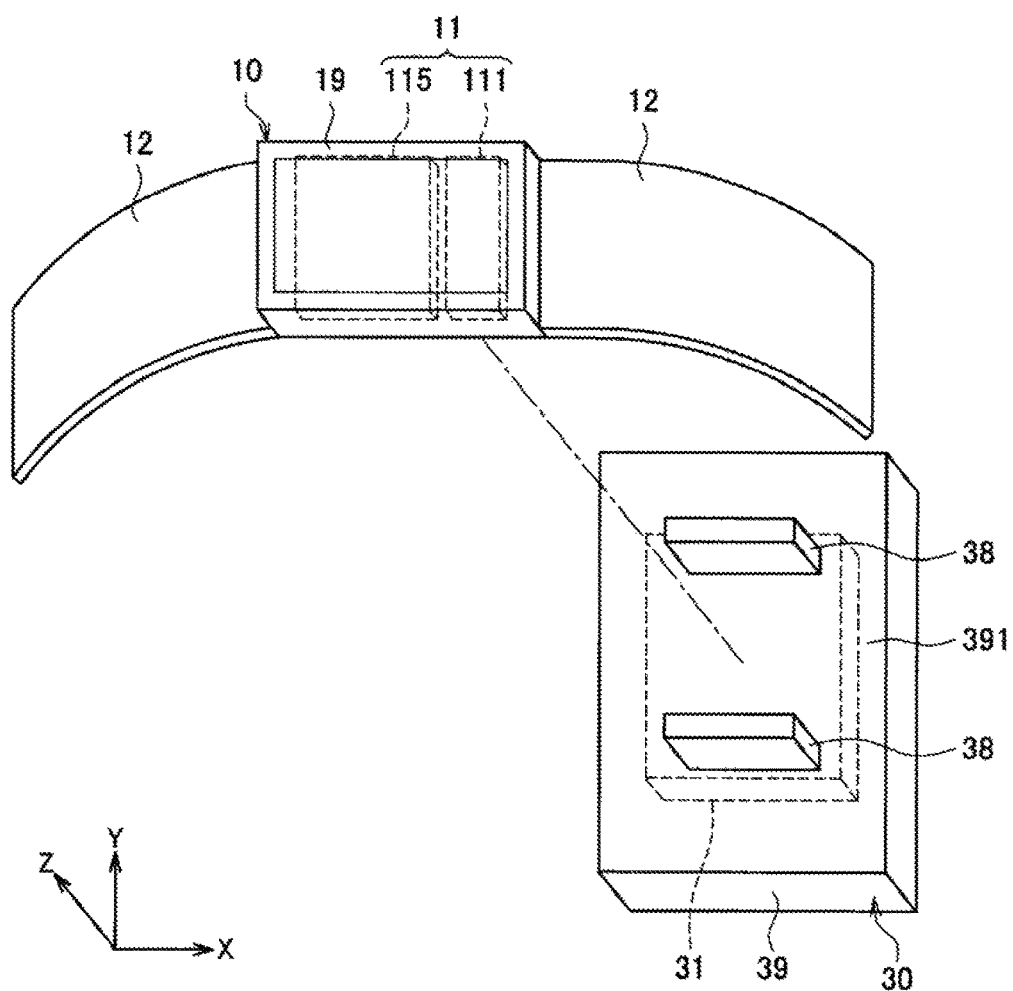
FIG. 3 is an explanatory diagram for describing an example of a configuration of a communication system according to the embodiment.
Figure 4:
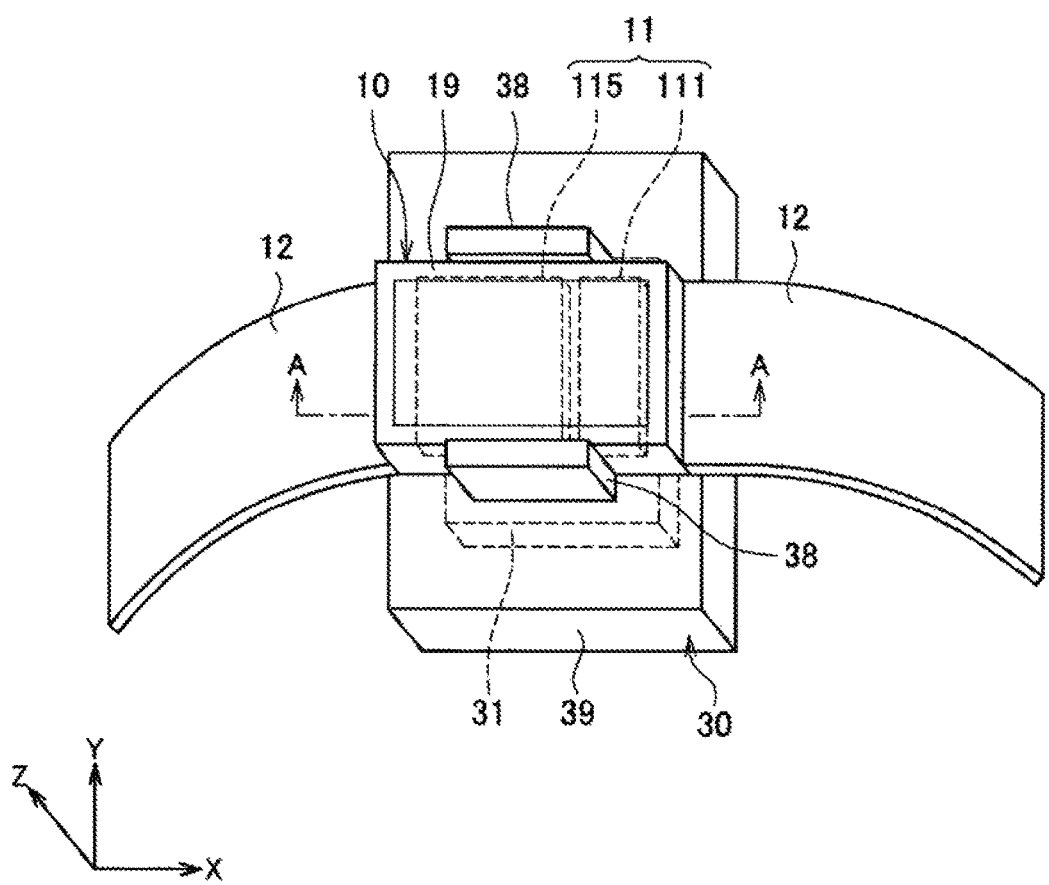
FIG. 4 is an explanatory diagram for describing an example of a configuration of a communication system according to the embodiment.

First, an example of a configuration of the communication system according to the present embodiment, that is, an example of configurations of the communication device 10 and the mounting base 30 will be described with reference to FIGS. 3 and 4. FIGS. 3 and 4 are explanatory diagram for describing an example of a configuration of the communication system according to the present embodiment. FIG. 3 illustrates a state in which the communication device 10 is separated from the mounting base 30, that is, a state in which the communication device 10 is not mounted (not held) on the mounting base 30. FIG. 4 illustrates a state in which the communication device 10 is mounted (held) on the mounting base 30. In the example illustrated in FIGS. 3 and 4, a horizontal direction in the drawings is referred to as an x direction, a vertical direction is referred to as a y direction, and a direction orthogonal to both the x direction and the y direction is referred to as a z direction.

As illustrated in FIGS. 3 and 4, the communication device 10 includes a device body 19, a communication circuit 11, and a wearing portion 12.

The communication circuit 11 is a device (a group of circuits) through which the communication device 10 performs communication with other devices via a wireless transmission path. The communication circuit 11 includes an antenna 111 for performing wireless communication and a control unit 115 that controls an operation of the antenna 111. The control unit 115 is installed in the device body 19 of the communication device 10. The antenna 111 may be installed in the device body 19 of the communication device 10, or a part or all of the antenna 111 may be installed to be exposed outside the device body 19.

As described above, the antenna characteristic of, the antenna 111 is optimized in advance by adjusting the resonance condition so that the transmission power is further increased when the communication device 10 is worn on the human body. It will be appreciated that the resonance condition of the antenna 111 can be adjusted by appropriately changing a circuit configuration of the antenna 111 and adjusting the impedance thereof.

The wearing portion 12 is a member for holding the device body 19 on a part of the human body so that a part of the human body (for example, the wrist) and the device body 19 has a predetermined position relation.

As a specific example, when the communication device 10 is configured as a wristwatch type wearable device as illustrated in FIGS. 1 and 2, the wearing portion 12 may be configured as, for example, a belt-like member. At this time, the wearing portion 12 holds the device body 19 of the communication device 10 on a part of the human body (for example, the wrist) so that a display surface (for example, a display) through which the communication device 10 presents the user with information faces the user.

A material of the wearing portion 12 is not particularly limited as long as the wearing portion 12 holds the device body 19 on a part of the human body. As a specific example, the wearing portion 12 may be made of an elastic material such as resin or rubber or may be made of a metallic material.

As illustrated in FIGS. 3 and 4, the mounting base 30 includes a base 39 and a correcting unit 31. The base 39 may be provided with a support portion 38.

The base 39 corresponds to a main body of the mounting base 30 on which the communication device 10 is mounted or held. The base 39 is provided with a region on which the communication device 10 is mounted or held. Hereinafter, the region of the base 39 on which the communication device 10 is mounted or held is also referred to as a "mounting portion 391."

The base 39 may be provided with the support portion 38 that supports the communication device 10 so that the communication device 10 mounted or held on the base 39 comes into contact with or comes close to the mounting portion 391. For example, the support portion 38 may be configured as a guide member that guides the position at which the communication device 10 is mounted or held on the base 39 so that the mounting portion 391 and the communication device 10 come into contact with or come close to each other. The support portion 38 may be configured as a member that holds the communication device 10 on the base 39 so that the support portion 38 engages with a part of the communication device 10, and the mounting portion 391 and the communication device 10 have a predetermined position relation. As described above, the configuration of the support portion 38 is not particularly limited as long as the communication device 10 is held on the base 39 to come into contact with or come close to the mounting portion 391.

The communication device 10 and the mounting base 30 may be configured so that a part of the device body 19 of the communication device 10 that comes into contact with or comes close to the human body comes into contact with or comes close to the mounting portion 391 when the communication device 10 is mounted or held on the mounting portion 391.

For example, in the example illustrated in FIGS. 3 and 4, the communication device 10 is configured such that a surface at an opposite side to a surface on which the display surface of the device body 19 for presenting the user with information at the time of wearing on the human body is installed comes into contact with or comes close to the human body. Further, when the communication device 10 is mounted or held on the mounting base 30, a surface of the device body 19 that comes into contact with or comes close to the human body at the time of wearing on the human body faces the mounting portion 391 of the mounting base 30, and comes into contact with or comes close to the mounting portion 391. Further, a part of the device body 19 of the communication device 10 that comes into contact with the human body at the time of wearing on the human body corresponding to an example of a "contact portion." Similarly, a part of the device body 19 that comes close to the human body at the time of wearing on the human body corresponds to an example of an "approach portion."

The correcting unit 31 includes a dielectric having relative permittivity that is predetermined based on relative permittivity of the human body. For example, the dielectric has relative permittivity that is substantially equal to the relative permittivity of the human body. In other words, the dielectric may be configured as a simulated human body that simulates a person. An example of a composition of the dielectric included in the correcting unit 31 will be described later as another example.

The correcting unit 31 is installed at a position at which the correcting unit 31 comes into contact with or comes close to the communication device 10 mounted or held on the mounting portion 391 of the base 39. The correcting unit 31 may be installed in the base 39 as illustrated in FIGS. 3 and 4. As another example, the correcting unit 31 may be installed so that at least a part thereof is exposed on the mounting portion 391. As another example, the correcting unit 31 may be installed on the mounting portion 391. As described above, the position at which the correcting unit 31 is installed is not particularly limited as long as the correcting unit 31 is installed to come into contact with or come close to the communication device 10 mounted or held on the mounting portion 391.

Figure 5:
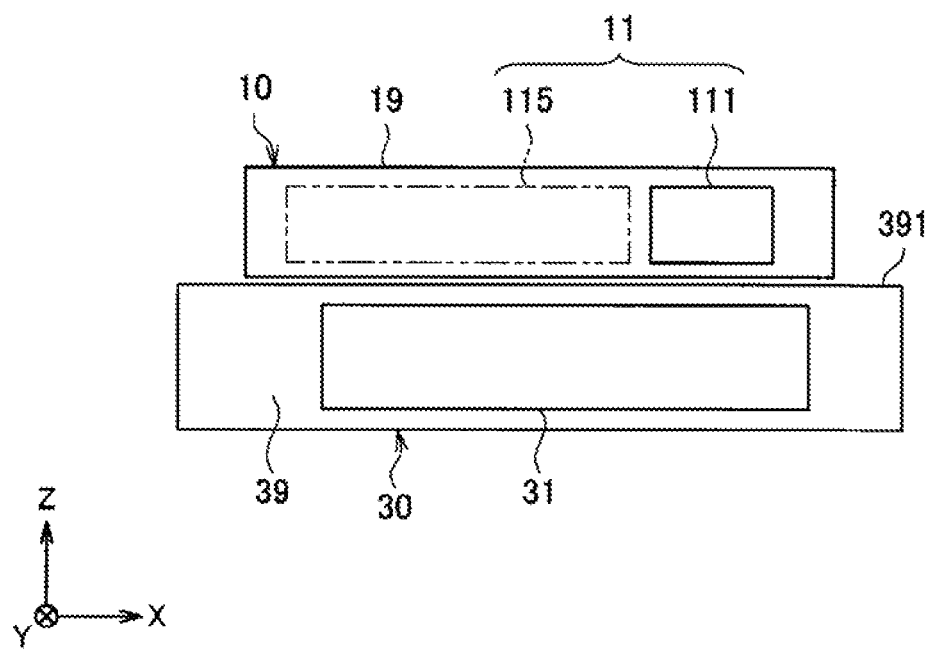
FIG. 5 is an explanatory diagram for describing a correcting unit installed in a mounting base according to the embodiment.

For example, FIG. 5 is an explanatory diagram for describing the correcting unit installed in the mounting base according to the present embodiment, that is, a schematic cross-sectional view of the communication device 10 and the mounting base 30 which is taken along line A-A of FIG. 4. In FIG. 5, in order to facilitate understanding of the description, instead of hatching the components, the control unit 115 is indicated by a different type of line (an alternate long and two short dashes line) from the other components. In FIG. 5, the support portion 38 illustrated in FIG. 4 is not illustrated.

As described above, since the correcting unit 31 is installed in the base 39, the antenna 111 of the communication device 10 and the correcting unit 31 come into contact with or come close to each other when the communication device 10 is mounted or held on the mounting portion 391 of the base 39 as illustrated in FIG. 5. Accordingly, the state in which the human body comes close to the antenna 111 at the time of wearing on the human body is simulated.

In other words, when the communication device 10 is removed from the human body, the antenna characteristic of the antenna 111 shifted to the higher frequency side than at the time of wearing on the human body is corrected to shift to the low frequency side as the antenna 111 and the correcting unit 31 come into contact with or come close to each other.

Through the above-described configuration, according to the communication system according to the present embodiment, when the communication device 10 is mounted or held on the mounting base 30, the antenna characteristic of the antenna 111 can be optimized, similarly to the time of wearing on the human body. In other words, according to the communication system according to the present embodiment, the antenna characteristic of the antenna 111 installed in the communication device 10 can be optimized both at the time of wearing on the human body and at the time of non-wearing on the human body.

The mounting base 30 may have a configuration for supplying electric power (a configuration of charging) to the communication device 10 or the battery installed in the communication device 10. As a specific example, the mounting base 30 may have a terminal for supplying electric power to the communication device 10 mounted or held on the mounting base 30. As another example, the mounting base 30 may have a configuration of supplying electric power to the communication device 10 through non-contact power transmission (that is, non-contact charging) (for example, an antenna element).

1.3. Example 1-1

Next, an example of a composition of the dielectric included in the correcting unit 31 will be described as an example 1-1, and then influence on the antenna characteristic when a sample of the dielectric is used based on the composition will be described together with an antenna characteristic simulation result.

First, an example of the composition of the dielectric included in the correcting unit 31 will be described with reference to FIG. 6. FIG. 6 illustrates an example of an electrical characteristic similar to human tissue as an electrical characteristic of the dielectric included in the correcting unit 31. The example of the electrical characteristic similarly to the human tissue illustrated in FIG. 6 is specified as a standard by an Association of Radio Industries and Businesses (ARIB) (ARIB "specific absorption rate (SAR) estimation for cellular phone ARIB STD-T56 3.0 edition" http://www.arib.or.jp/english/html/overview/doc/1-STD-T56v3_0.pdf (browsed on Jun. 12, 2014).

In the standard, a wireless communication frequency is a range of 30 MHz to 6000 MHz, and electrical characteristics of the human body are specified for a temporal part of the human body and a part other than the temporal part of the human body. In other words, according to the standard, in the case of the temporal part of the human body, in the range in which the wireless communication frequency is 300 MHz to 3000 MHz, the real part $\varepsilon r'$ of the relative permittivity is specified in a range of 38.5 to 45.3, and conductivity $\sigma$ is specified in a range of 0.87 [S/m] to 2.40 [S/m]. In the case of the part other than the temporal part of the human body, in the range in which the wireless communication frequency is 30 MHz to 6000 MHz, the real part $\varepsilon r'$ of the relative permittivity is specified in a range of 35.1 to 55.0, and the conductivity $\sigma$ is specified in a range of 0.75 [S/m] to 5.48 [S/m].

As a specific example, when the wireless communication frequency is 900 MHz, in both the temporal part of the human body and the part other than the temporal part of the human body, the real part $\varepsilon r'$ of the relative permittivity is specified to be 41.5, and the conductivity $\sigma$ is specified to be 0.97 [S/m]. As another example, when the wireless communication frequency is 1800 MHz, in both the temporal part of the human body and the part other than the temporal part of the human body, the real part $\varepsilon r'$ of the relative permittivity is specified to be 40.0, and the conductivity $\sigma$ is specified to be 1.40 [S/m].

In the standard, the following materials are specified as an example of materials for preparing a phantom solvent (that is, the dielectric) in which the human body is simulated:

sucrose (98%)
sodium chloride (99+%)
deionized water (electrical resistivity 16MΩ)
hydroxyethyl cellulose (HEC)
preservative
diethylene glycol monobutyl ether (DGBE)
propylene glycol
dibutyl carbitol
diacetin
1,2-propanediol
tween
emulsifier
mineral oil In the present example, a sample of the dielectric included in the correcting unit 31 is prepared by preparing the phantom solvent using sucrose, deionized water, sodium chloride, HEC, and the preservative and filling an outer shell with the prepared phantom solvent. At the time of preparation of the phantom solvent, the amounts of the materials are adjusted such that sucrose is 56.50%, deionized water is 40.71%, sodium chloride is 1.48%, HEC is 0.99%, and the preservative is 0.19%. A shaped container is used as the outer shell filled with the phantom solvent, and a container that has as little influence as possible on the measurement. Hereinafter, the prepared sample is also referred to as a "sample 31a."

Figure 7:
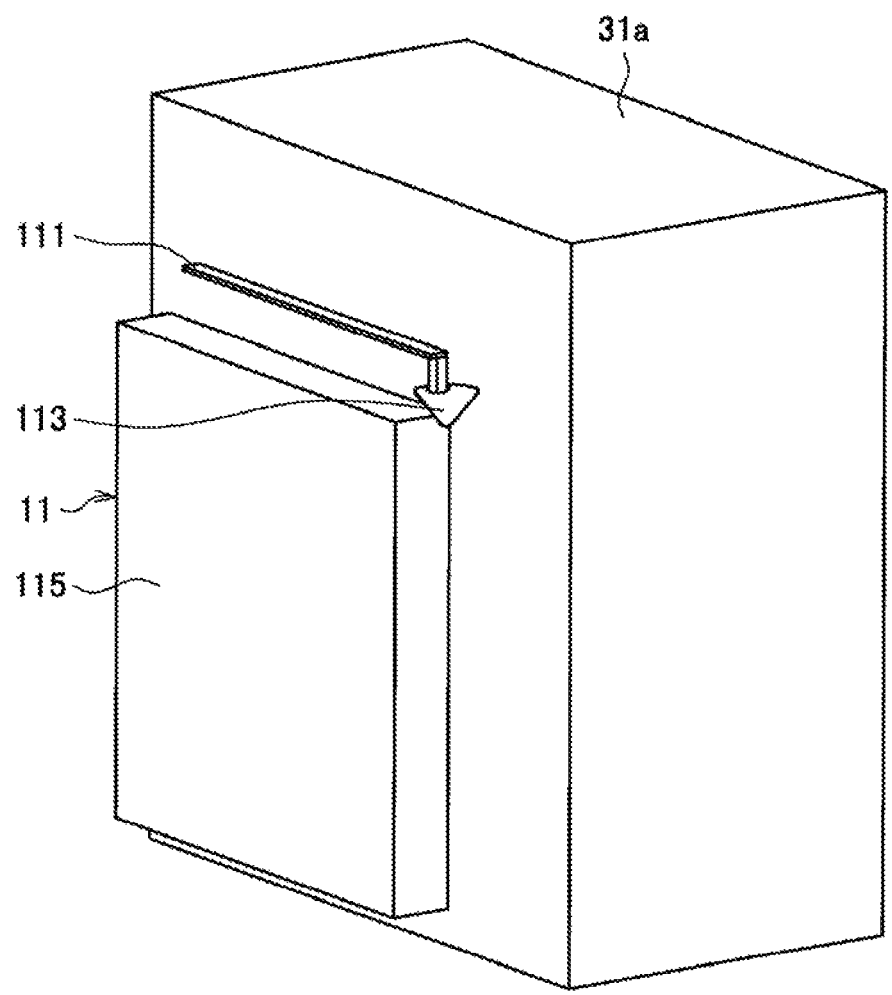
FIG. 7 is an explanatory diagram for describing a simulation condition according to an example 1.

Next, an antenna characteristic simulation condition according to the example 1-1 will be described with reference to FIG. 7. FIG. 7 is an explanatory diagram for describing the simulation condition according to the example 1-1.

In FIG. 7, a reference numeral 11 indicates a communication circuit that simulates the communication circuit 11 of the communication device 10 illustrated in FIGS. 3 and 4. In other words, the communication circuit 11 illustrated in FIG. 7 includes an antenna 111, a power supply point 113, and a control unit 115. The antenna 111 and the control unit 115 illustrated in FIG. 7 correspond to the antenna 111 and the control unit 115 illustrated in FIGS. 3 and 4. The power supply point 113 illustrated in FIG. 7 indicates a connection point to which a power supply line for supplying electric power to the antenna 111 is connected.

As illustrated in FIG. 7, in the present example, the antenna characteristic of the antenna 111 installed in the communication circuit 11 was simulated by bringing the communication circuit 11 close to the sample 31a. As a comparative example 1, the antenna characteristic of the antenna 111 was simulated when the communication circuit 11 illustrated in FIG. 7 is brought close to the human body. As the comparative example 2, the antenna characteristic of the antenna 111 was simulated when the communication circuit 11 illustrated in FIG. 7 is alone (that is, separated from the human body) In the simulations according to the present example, the comparative example 1, and the comparative example 2, 1.6 GHz is assumed to be used as the frequency band used for communication.

Figure 8:
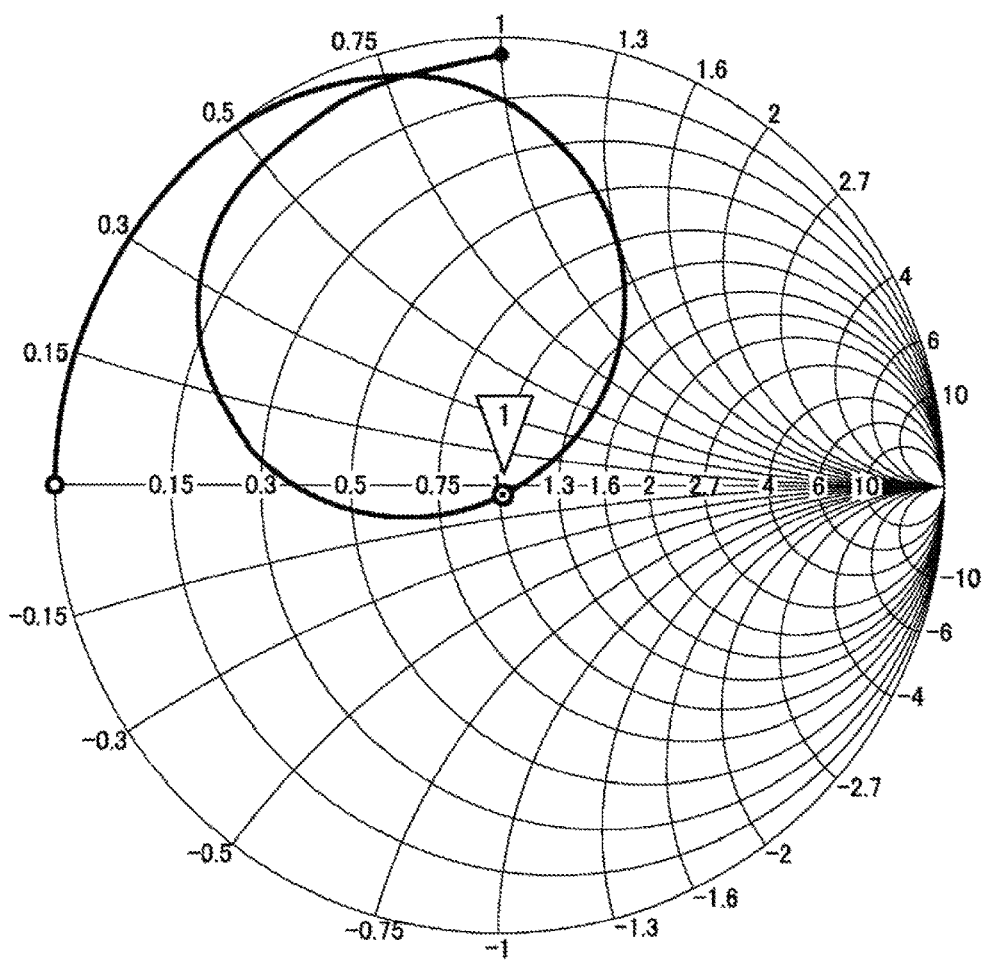
FIG. 8 illustrates an example of a simulation result of antenna characteristic of a communication circuit according to a comparative example 1.

First, the antenna characteristic simulation result of the communication circuit 11 according to the comparative example 1 will be described with reference to FIGS. 8 and 9. FIG. 8 illustrates an example of the antenna characteristic simulation result of the communication circuit 11 according to the comparative example 1, that is, illustrates an example of a Smith chart showing the impedance characteristic of the antenna 111. In FIG. 8, a marker indicated by a reference numeral 1 corresponds to a frequency of 1.6 GHz used for communication.

It is understood that, in the communication circuit 11, the impedance characteristic of the antenna 111 is adjusted so that a load and a transmission line are matched, and reflection loss (return loss) is further decreased when 1.6 GHz is used for communication, as illustrated in FIG. 8.

Figure 9:
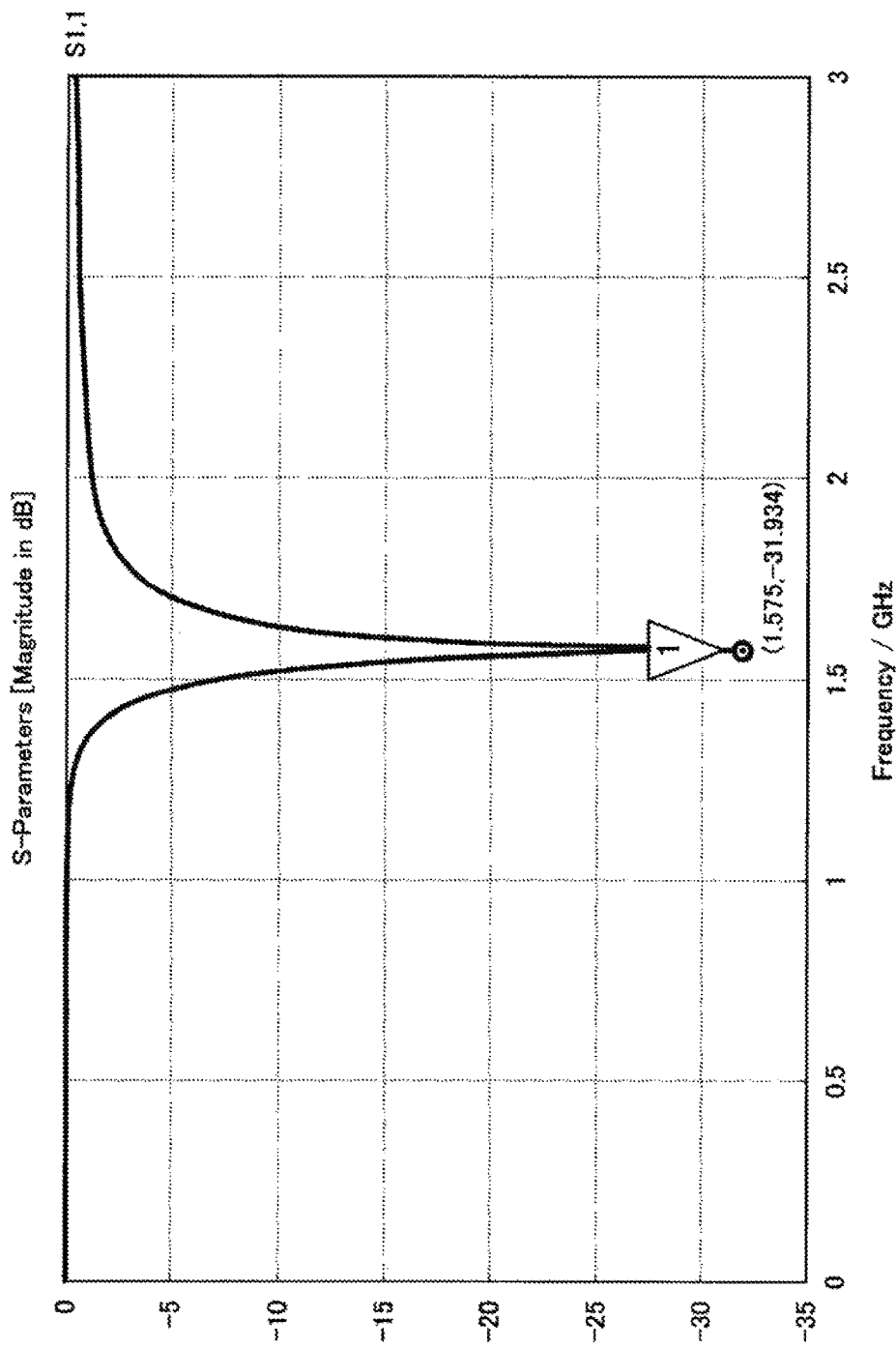
FIG. 9 illustrates an example of a simulation result of antenna characteristic of a communication circuit according to the comparative example 1.

FIG. 9 illustrates an example of the antenna characteristic simulation result of the communication circuit 11 according to the comparative example 1, that is, a simulation result of an S parameter of the antenna 111. In FIG. 9, a horizontal axis indicates a frequency [GHz], and a vertical axis indicates the reflection loss (return loss) [dB] of the antenna 111. In FIG. 9, a marker indicated by a reference numeral 1 corresponds to a frequency of 1.6 GHz used for communication.

It is understood that in the communication circuit 11, the frequency characteristic of the antenna 111 is adjusted so that the reflection loss (return loss) is smallest when 1.6 GHz is used for communication as illustrated in FIG. 9.

Figure 10:
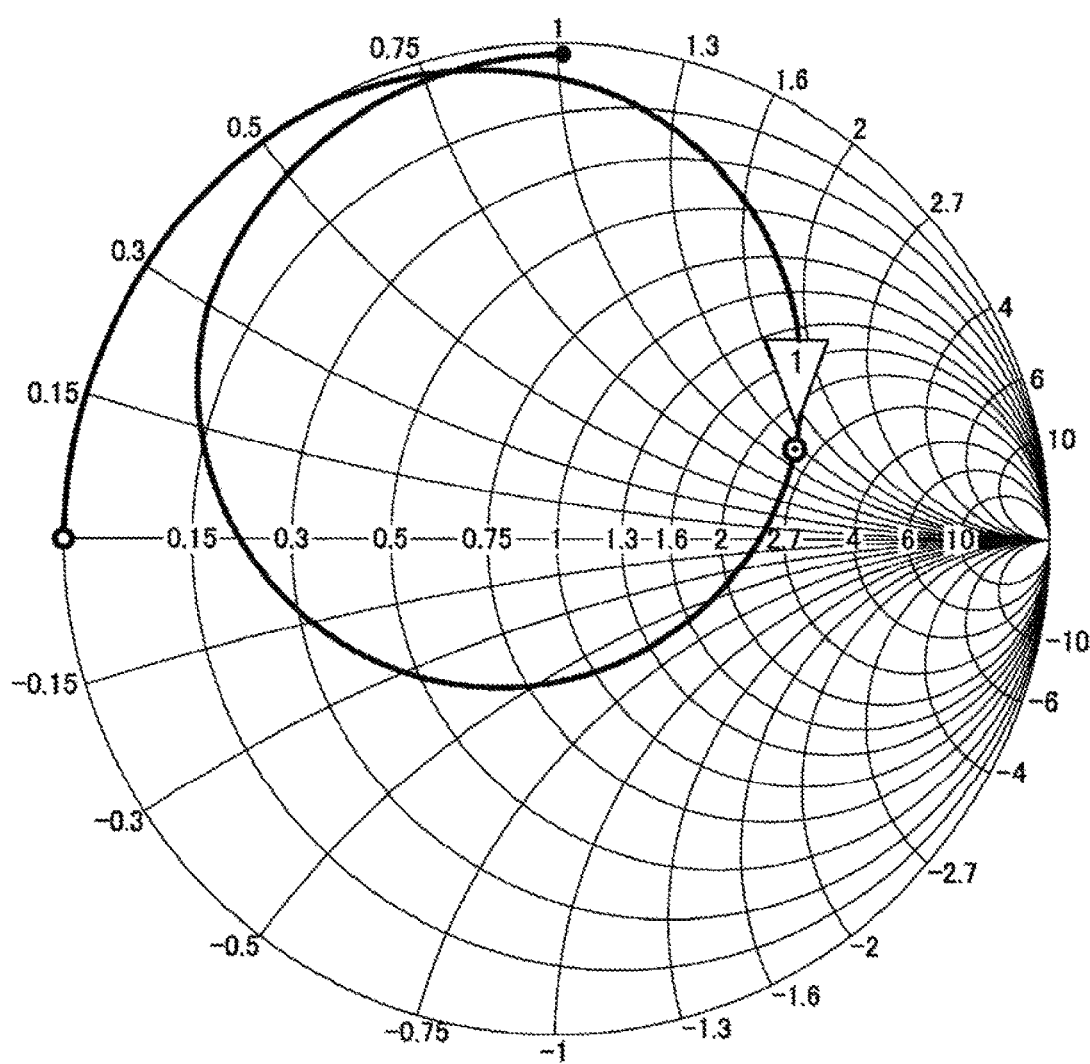
FIG. 10 illustrates an example of a simulation result of antenna characteristic of a communication circuit according to a comparative example 2.

Next, the antenna characteristic simulation result of the communication circuit 11 according to the comparative example 2 will be described with reference to FIGS. 10 and 11. FIG. 10 illustrates an example of the antenna characteristic simulation result of the communication circuit 11 according to the comparative example 2, that is, illustrates an example of a Smith chart showing the impedance characteristic of the antenna 111. In FIG. 10, a marker indicated by a reference numeral 1 corresponds to a frequency of 1.6 GHz used for communication.

As understood from a comparison of FIG. 10 and FIG. 8, in the communication circuit 11 according to the comparative example 2, with the separation from the human body, the impedance characteristic changes than in the simulation result according to the comparative example 1 illustrated in FIG. 8. Thus, it is understood that in the communication circuit 11 according to the comparative example 2, the reflection loss (return loss) of the antenna 111 is increased to be larger than in the simulation result according to the comparative example 1 illustrated in FIG. 8.

Figure 11:
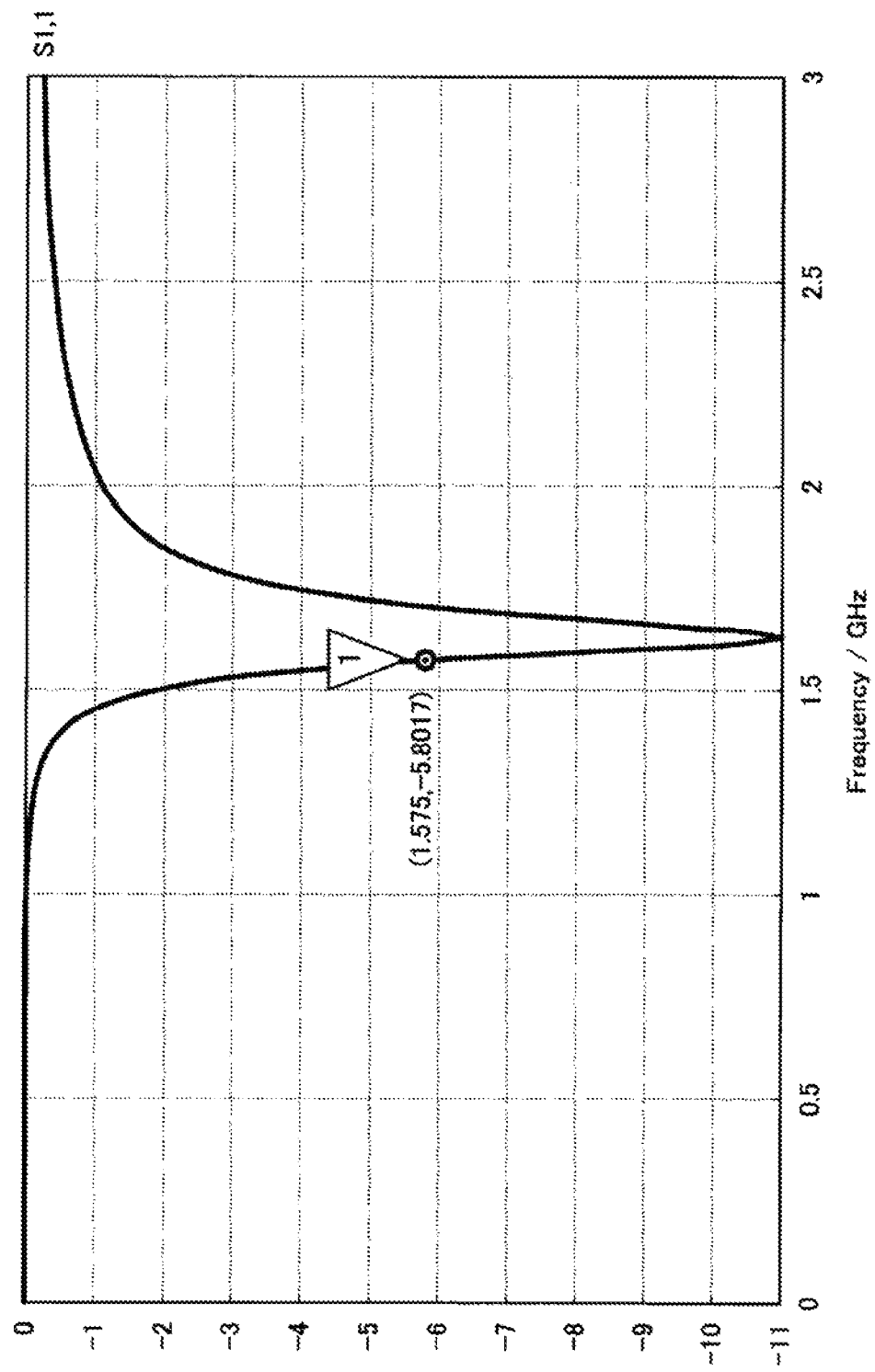
FIG. 11 illustrates an example of a simulation result of antenna characteristic of a communication circuit according to the comparative example 2.

FIG. 11 illustrates an example of the antenna characteristic simulation result of the communication circuit 11 according to the comparative example 2, that is, a simulation result of an S parameter of the antenna 111. In FIG. 11, a horizontal axis indicates a frequency [GHz], and a vertical axis indicates the reflection loss (return loss) [dB] of the antenna 111. In FIG. 11, a marker indicated by a reference numeral 1 corresponds to a frequency of 1.6 GHz used for communication.

As understood from a comparison of FIG. 11 and FIG. 9, in the communication circuit 11 according to the comparative example 2, with the separation from the human body, the frequency characteristic shifts to the higher frequency side than in the simulation result according to the comparative example 1 illustrated in FIG. 9. Thus, it is understood that in the communication circuit 11 according to the comparative example 2, the reflection loss (return loss) of the antenna 111 is increased to be larger than in the simulation result according to the comparative example 1 illustrated in FIG. 9.

Figure 12:
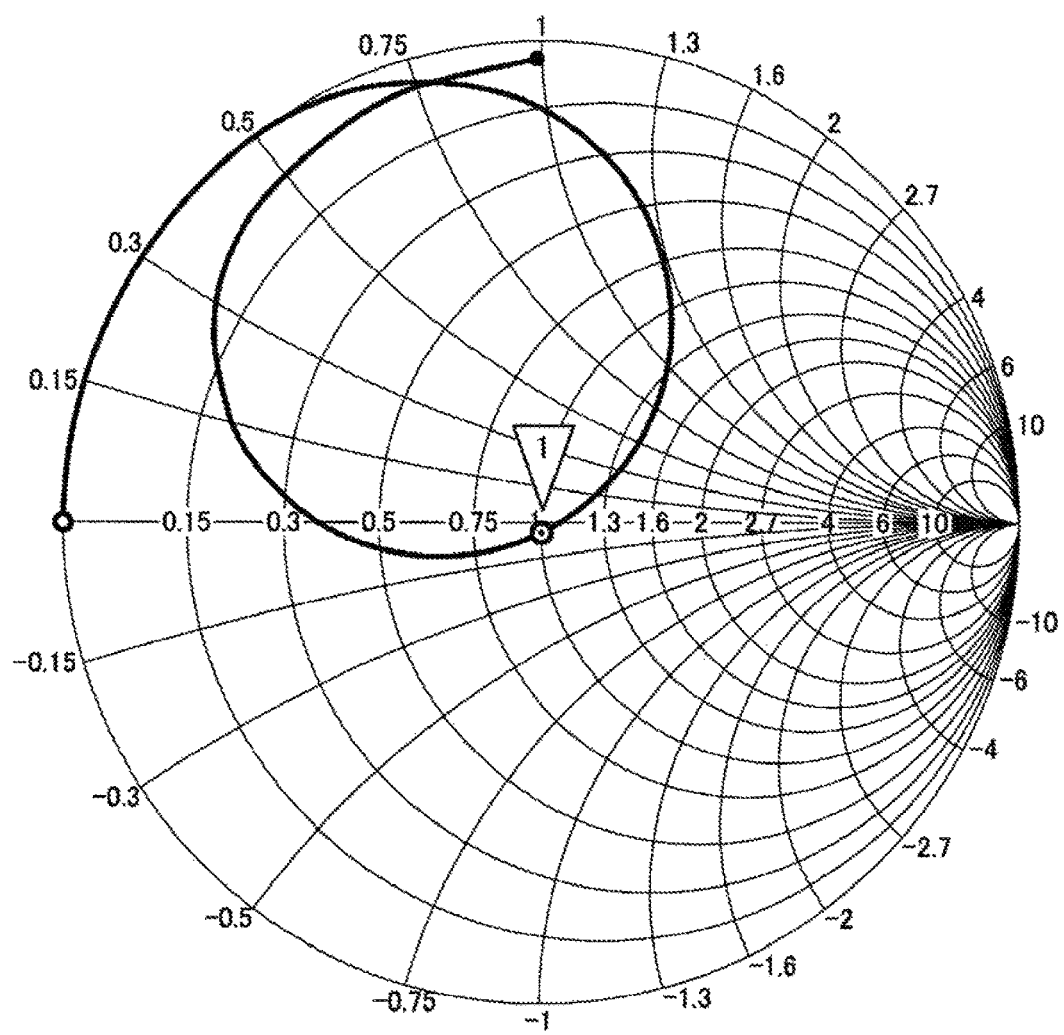
FIG. 12 illustrates an example of a simulation result of antenna characteristic of a communication circuit according to an example 1-1.

Next, the antenna characteristic simulation result of the communication circuit 11 according to the present example will be described with reference to FIGS. 12 and 13. FIG. 12 illustrates an example of the antenna characteristic simulation result of the communication circuit 11 according to the example 1-1, that is, illustrates an example of a Smith chart showing the impedance characteristic of the antenna 111. In FIG. 12, a marker indicated by a reference numeral 1 corresponds to a frequency of 1.6 GHz used for communication.

As understood from a comparison of FIG. 12 and FIG. 10, in the communication circuit 11 according to the present example, the change in the impedance characteristic caused by the separation from the human body is corrected. Thus, it is understood that in the communication circuit 11 according to the present example, the reflection loss (return loss) of the antenna 111 is decreased to be smaller than in the simulation result according to the comparative example 2 illustrated in FIG. 10. As understood from a comparison of FIG. 12 and FIG. 8, by bringing the communication circuit 11 close to the sample 31a, the state in which the communication circuit 11 is brought close to the human body is simulated as in the comparative example 1.

Figure 13:
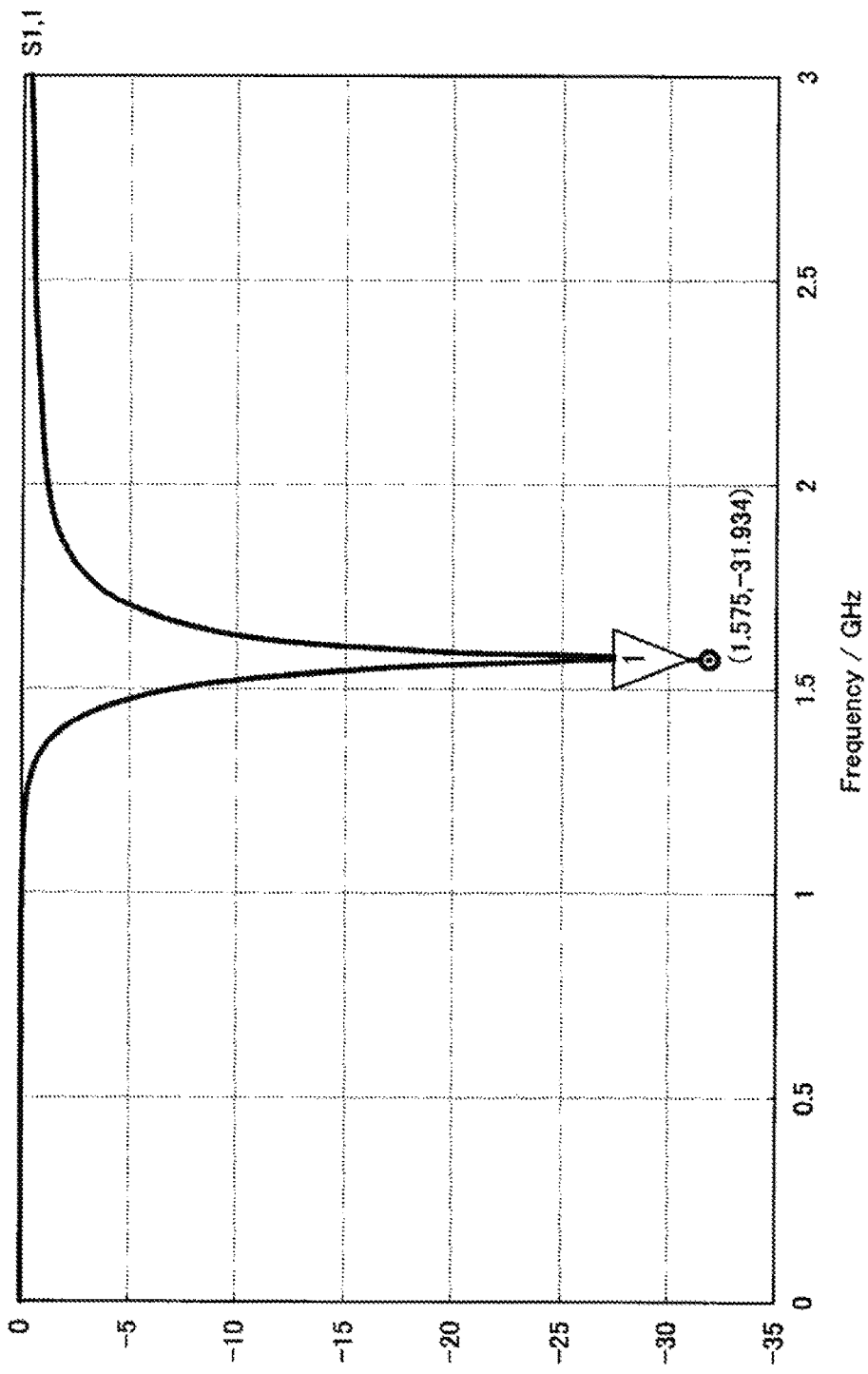
FIG. 13 illustrates an example of a simulation result of antenna characteristic of a communication circuit according to the example 1-1.

FIG. 13 illustrates an example of the antenna characteristic simulation result of the communication circuit 11 according to the example 1-1, that is, a simulation result of an S parameter of the antenna 111. In FIG. 13, a horizontal axis indicates a frequency [GHz], and a vertical axis indicates the reflection loss (return loss) [dB] of the antenna 111. In FIG. 13, a marker indicated by a reference numeral 1 corresponds to a frequency of 1.6 GHz used for communication.

As understood from a comparison of FIG. 13 and FIG. 11, in the communication circuit 11 according to the present example, the frequency characteristic of the antenna 111 shifted to the high frequency side with the separation from the human body is corrected to shift to the low frequency side. Thus, it is understood that in the communication circuit 11 according to the present example, the reflection loss (return loss) of the antenna 111 is decreased to be smaller than in the simulation result according to the comparative example 2 illustrated in FIG. 11. As understood from a comparison of FIG. 13 and FIG. 9, by bringing the communication circuit 11 close to the sample 31*a*, the state in which the communication circuit 11 is brought close to the human body is simulated as in the comparative example 1.

The example of the composition of the dielectric included in the correcting unit 31 has been described above as the example 1-1, and then the influence on the antenna characteristic using the sample of the dielectric based on the above composition has been described together with the antenna characteristic simulation result.

1.4. Modified Example 1

Next, another example of the correcting unit 31 will be described as a modified example 1. In the above-described embodiment, the correcting unit 31 is configured to include the dielectric having the relative permittivity that is predetermined based on the relative permittivity of the human body. On the other hand, the correcting unit 31 according to the modified example 1 includes a correcting circuit that corrects the impedance characteristic of the antenna 111 instead of the dielectric. Hereinafter, the correcting unit 31 according to the modified example 1 is also referred to as a "correcting unit 31*b*" when it is necessary to explicitly distinguish it from the correcting unit 31 according to the above-described embodiment.

Figure 14:
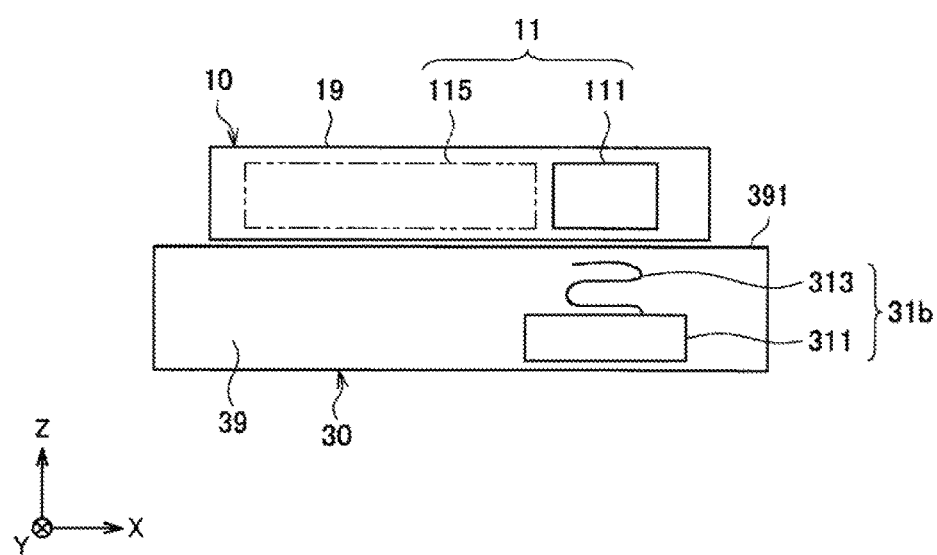
FIG. 14 is an explanatory diagram for describing a correcting unit installed in a mounting base according to a modified example 1.

For example, FIG. 14 is an explanatory diagram for describing the correcting unit 31*b* according to the modified example 1 and illustrates an example in which the correcting unit 31*b* according to the modified example 1 is installed instead of the correcting unit 31 in the mounting base 30 illustrated in FIG. 5.

As illustrated in FIG. 14, the correcting unit 31*b* according to the modified example 1 includes a loading load 311 and a coupling element 313.

The coupling element 313 is configured as a so-called resonance circuit. The loading load 311 is a load used for adjusting a resonance condition of the coupling element 313. The coupling element 313 may be configured with, for example, an LC resonance circuit. The loading load may be configured with, for example, a resistor having a predetermined resistance value. In other words, the resonance condition of the coupling element 313 may be adjusted by the shape of the coupling element 313 or a circuit configuration of the coupling element 313 and the loading load 311.

In other words, in the correcting unit 31*b* according to the modified example 1, when the antenna 111 comes close to the coupling element 313, the coupling element 313 resonates with a predetermined frequency due to power supply from the antenna 111, and a high-frequency current is induced to the coupling element 313. The correcting unit 31*b* changes the impedance characteristic of the antenna 111 by the high-frequency current induced to the coupling element 313.

The correcting unit 31*b* according to the modified example 1 corrects the impedance characteristic of the antenna 111 that changes with the separation of the communication device 10 from the human body using such characteristics, and optimizes the antenna characteristic of the antenna 111. A correction amount of the impedance characteristic of the antenna 111 is decided based on the resonance condition of the coupling element 313. In other words, it is possible to control the correction amount of the impedance characteristic of the antenna 111 by adjusting the resonance condition of the coupling element 313.

Next, influence on the antenna characteristic when the correcting unit 31*b* according to the modified example 1 is used was simulated as an example 1-2. In this regard, a condition and a result of the simulation are described below.

Figure 15:
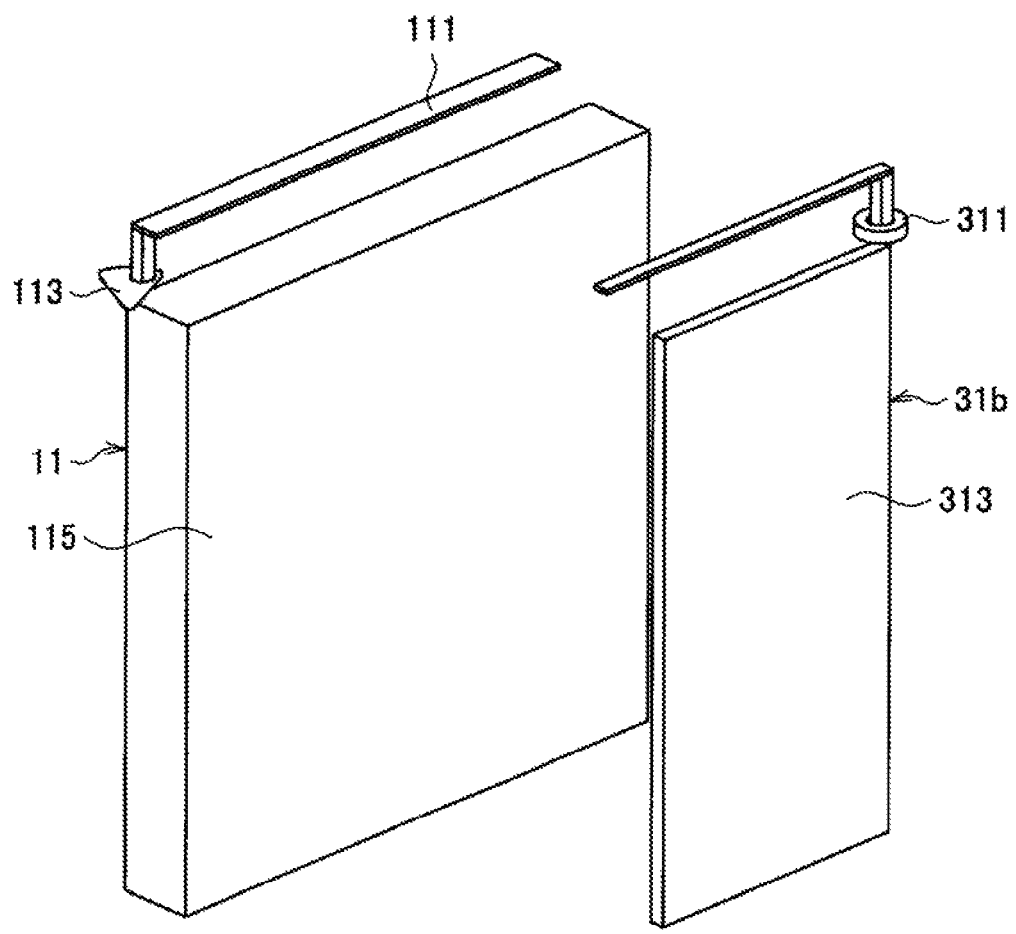
FIG. 15 is an explanatory diagram for describing a configuration of the correcting unit installed in the mounting base according to the modified example 1.

First, an antenna characteristic simulation condition according to the example 1-2 will be described with reference to FIG. 15. FIG. 15 is an explanatory diagram for describing the simulation condition according to the example 1-2.

In the example 1-2, the same circuit as the communication circuit described in the example 1-1 with reference to FIG. 7 was used as the communication circuit 11. In other words, when the communication circuit 11 is brought close to the human body, the antenna characteristic simulation result of the communication circuit is the same as described above with reference to FIGS. 8 and 9 in the comparative example 1. Similarly, when the communication circuit 11 is alone (that is, separated from the human body), the antenna characteristic simulation result of the communication circuit is the same as described above with reference to FIGS. 10 and 11 in the comparative example 2.

In FIG. 15, a reference numeral 31*b* is a correcting circuit that simulates the correcting unit 31*b* described above with reference to FIG. 14. The loading load 311 and the coupling element 313 illustrated in FIG. 15 correspond to the loading load 311 and the coupling element 313 illustrated in FIG. 14.

In the example 1-2, the resonance condition of the coupling element 313 was adjusted so that inductance of the coupling element 313 is 13 [nH].

Figure 16:
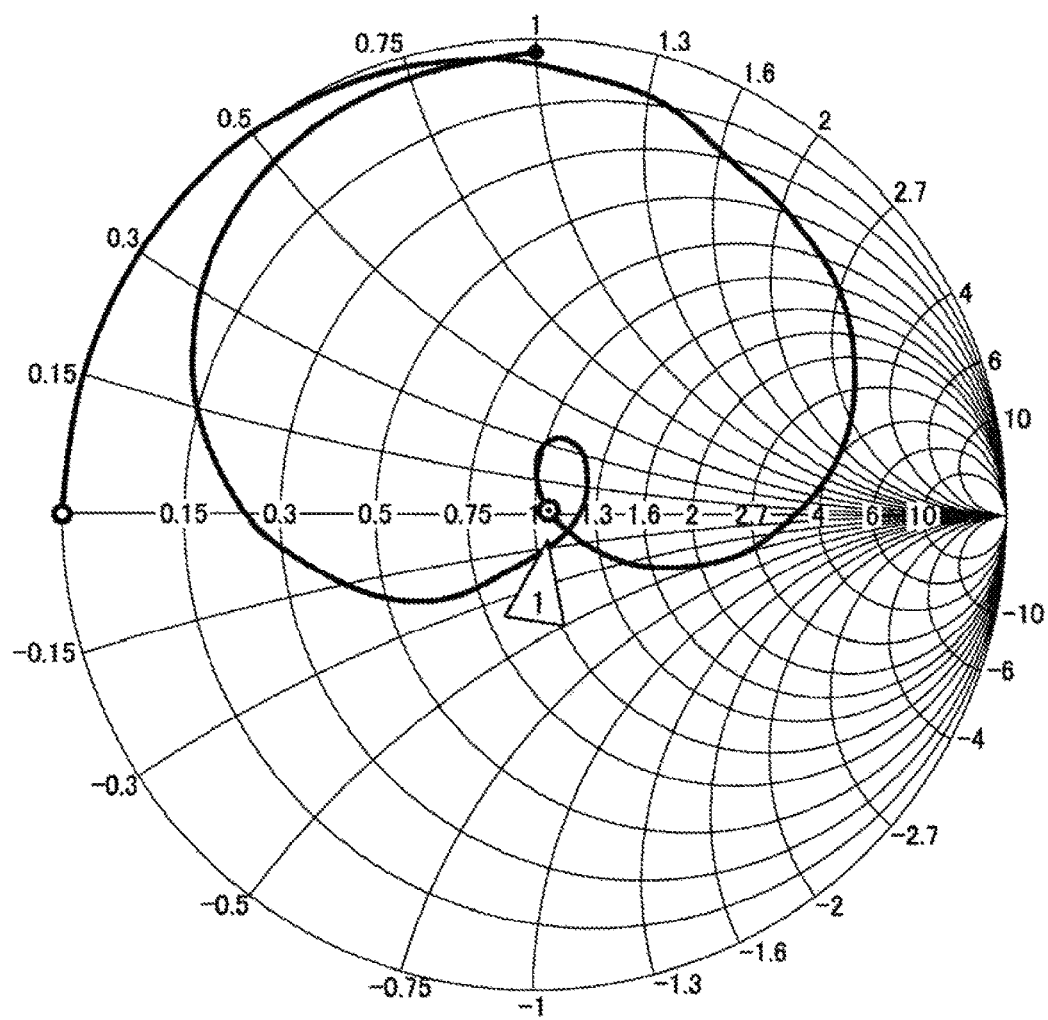
FIG. 16 illustrates an example of a simulation result of antenna characteristic of a communication circuit according to an example 1-2.

For example, FIG. 16 illustrates an example of the antenna characteristic simulation result of the communication circuit 11 according to the example 1-2, that is, an example of a Smith chart showing the impedance characteristic of the antenna 111. In FIG. 16, a marker indicated by a reference numeral 1 corresponds to a frequency of 1.6 GHz used for communication.

As understood from a comparison of FIG. 16 and FIG. 10, in the communication circuit 11 according to the present example, the change in the impedance characteristic caused by the separation from the human body is corrected. Thus, it is understood that in the communication circuit 11 according to the present example, the reflection loss (return loss) of the antenna 111 is decreased to be smaller than in the simulation result according to the comparative example 2 illustrated in FIG. 10. As understood from a comparison of FIG. 16 and FIG. 8, by bringing the communication circuit 11 close to the correcting unit 31*b*, the state in which the communication circuit 11 is brought close to the human body is simulated as in the comparative example 1.

Figure 17:
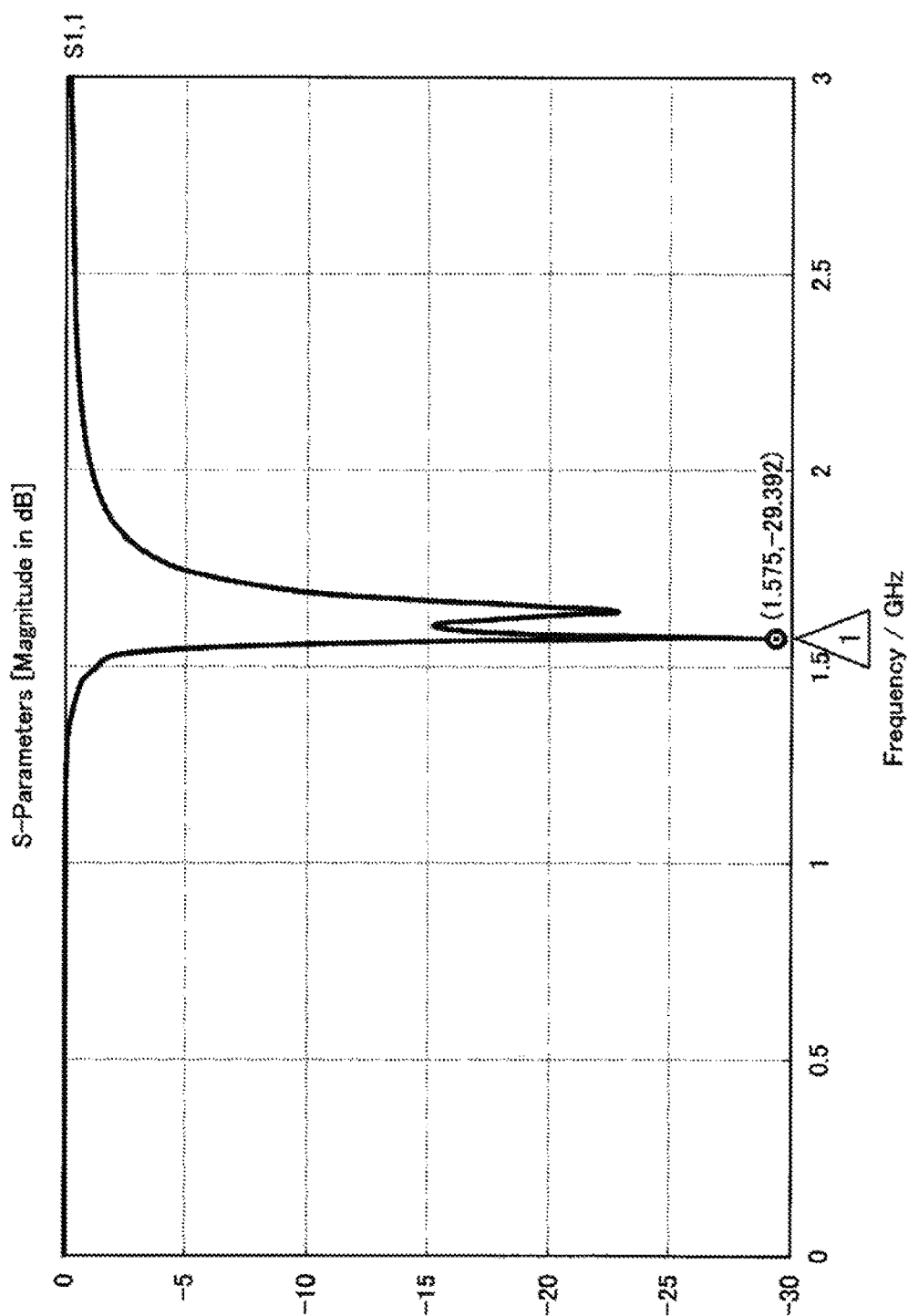
FIG. 17 illustrates an example of a simulation result of antenna characteristic of a communication circuit according to the example 1-2.

FIG. 17 illustrates an example of the antenna characteristic simulation result of the communication circuit 11 according to the example 1-2, that is, a simulation result of an S parameter of the antenna 111. In FIG. 17, a horizontal axis indicates a frequency [GHz], and a vertical axis indicates the reflection loss (return loss) [dB] of the antenna 111. In FIG. 17, a marker indicated by a reference numeral 1 corresponds to a frequency of 1.6 GHz used for communication.

As understood from a comparison of FIG. 17 and FIG. 11, in the communication circuit 11 according to the present example, the frequency characteristic of the antenna 111 shifted to the high frequency side with the separation from the human body is corrected to shift to the low frequency side. Thus, it is understood that in the communication circuit 11 according to the present example, the reflection loss (return loss) of the antenna 111 is decreased to be smaller than in the simulation result according to the comparative example 2 illustrated in FIG. 11. As understood from a comparison of FIG. 17 and FIG. 9, by bringing the communication circuit 11 close to the correcting unit 31b, the state in which the communication circuit 11 is brought close to the human body is simulated as in the comparative example 1.

The influence on the antenna characteristic when the correcting unit 31b according to the modified example 1 is used has been described above as the example 1-2 together with the antenna characteristic simulation result.

As described above, the correcting unit 31b according to the modified example 1 includes the correcting circuit that corrects the impedance characteristic of the antenna 111 configured with the loading load 311 and the coupling element 313. Through this configuration, the correcting unit 31b according to the modified example 1 corrects the impedance characteristic of the antenna 111 through high-frequency current induced to the coupling element 313 by bringing the coupling element 313 close to the antenna 111.

Accordingly, according to the communication system according to the modified example 1, it is possible to optimize the antenna characteristic of the antenna 111 when the communication device 10 is mounted or held on the mounting base 30, similarly to the time of wearing on the human body.

1.5 Conclusion

As described above, in an antenna 111 of the communication device 10 according to the present embodiment illustrated in FIGS. 1 and 2, the antenna characteristic is optimized in advance so that the transmission power is further increased when the communication device 10 is worn on the human body. A mounting base 30 is provided with a correcting unit 31 that corrects the antenna characteristic of the antenna of the communication device 10 mounted or held on the mounting base 30. At this time, the correcting unit 31 corrects the frequency characteristic of the antenna of the communication device 10 shifted to the higher frequency side than at the time of wearing on the human body as it is removed from the human body so that the frequency characteristic of the antenna of the communication device 10 becomes equal to that at the time of wearing on the human body (that is, shifts to the low frequency side).

Through this configuration, even when the communication device 10 is mounted or held on the mounting base 30, the antenna characteristic of the antenna 111 of the communication device 10 is corrected so that the transmission power is further increased, similarly to the time of wearing on the human body.

In other words, in the communication system according to the present embodiment, the antenna characteristic of the antenna 111 of the communication device 10 is optimized in any of the state in which the communication device 10 is worn on the human body and the state in which the communication device 10 is not worn on the human body (that is, the state in which the communication device 10 is mounted or held on the mounting base 30). For this reason, according to the communication system according to the present embodiment, performance of a device (that is, the antenna or the wireless device) used when the communication device 10 performs wireless communication can be sufficiently used both at the time of wearing on the human body and at the time of non-wearing on the human body.

The example in which the communication device 10 is configured as a so-called watch type wearable device has been described above, but the configuration of the communication device 10 is not particularly limited as long as the antenna 111 and the correcting unit 31 come into contact with or come close to each other when the communication device 10 is mounted on the mounting base 30. As a specific example, the communication device 10 may be configured as a so-called glasses type wearable device.

2. Second Embodiment 2.1. Overview

Next, a communication system according to a second embodiment of the present disclosure will be described. In the communication device 10 that can be worn on the human body and used, there are cases in which the transmission power of the antenna 111 is restricted to protect the human body from the radio wave transmitted from the antenna 111 at the time of wearing on the human body.

Meanwhile, when the communication device 10 is not worn on the human body, for example, when the communication device 10 is mounted or held on the mounting base 30, the human body does not necessarily come close to the antenna 111. In this regard, in the communication system according to the present embodiment, when the communication device 10 is mounted or held on the mounting base 30, the transmission power of the antenna 111 of the communication device 10 is increased to improve communication performance.

Figure 18:
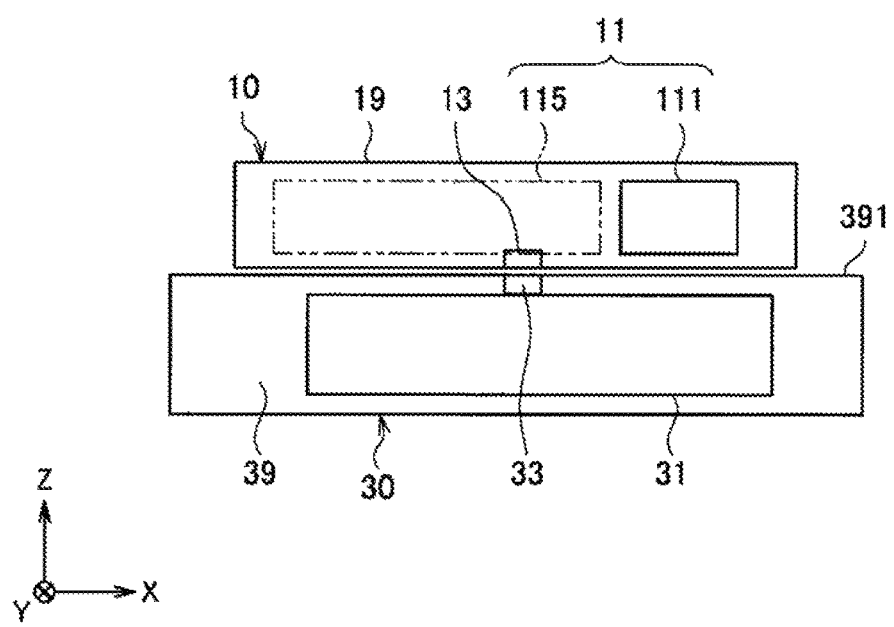
FIG. 18 is an explanatory diagram for describing an example of a schematic configuration of a communication system according to a second embodiment of the present disclosure.

Here, an example of a schematic configuration of the communication system according to the present embodiment will be described with reference to FIG. 18. FIG. 18 is an explanatory diagram for describing an example of a schematic configuration of the communication system according to the present embodiment, and illustrates a schematic cross-sectional view of the communication device 10 and the mounting base 30 according to the present embodiment. The present description will proceed focusing on a different configuration from the communication system according to the first embodiment described above with reference to FIG. 5, and a detailed description of a configuration similar to the communication system according to the first embodiment is omitted.

As illustrated in FIG. 18, in the communication device 10 according to the present embodiment, a detecting unit 13 is installed in a part that comes into contact with or comes close to the mounting portion 391 of the mounting base 30 when the communication device 10 is mounted or held on the mounting base 30. In the mounting base 30, a detection subject 33 is installed at a position on the mounting portion 391 facing the detecting unit 13 when the communication device 10 is mounted or held on the mounting base 30.

The detecting unit 13 is a component for detecting contact or approach of the detection subject 33. The detecting unit 13 may be configured with, for example, a magnetoresistive (MR) element, a hall element, or the like. In this case, the detection subject 33 may be configured with a magnetic substance such as a magnet. As another example, the detecting unit 13 may be configured with various kinds of sensors capable of detecting the contact or the approach of the detection subject 33 such as a so-called proximity sensor.

As described above, in the communication system according to the present embodiment, the detecting unit 13 and the detection subject 33 are installed, and the communication device 10 recognizes whether or not the communication device 10 is mounted or held on the mounting base 30 based on the detection result of the detecting unit 13. It will be appreciated that the configurations of the detecting unit 13 and the detection subject 33 are not particularly limited as long as the detecting unit 13 can detect the contact or the approach of the detection subject 33 when the communication device 10 is mounted or held on the mounting base 30.

The communication device 10 according to the present embodiment increases the transmission power of the antenna 111 when the communication device 10 is recognized to be mounted or held on the mounting base 30.

The communication device 10 restricts the transmission power of the antenna 111 when the communication device 10 is determined not to be mounted (held) on the mounting base 30 based on the detection result of the detecting unit 13.

As described above, the communication device 10 according to the present embodiment recognizes whether or not the communication device 10 is mounted or held on the mounting base 30, and controls the transmission power of the antenna 111 according to the recognized state. Accordingly, the communication device 10 restricts the transmission power of the antenna 111 in the state in which the communication device 10 can be worn on the human body, and increases the transmission power of the antenna 111 in the state in which the human body does not come close to the antenna 111, and thus the communication performance can be improved. In this regard, the communication system according to the present embodiment will be described below in further detail, particularly, focusing on the communication device 10.

2.2. Functional Configuration

Figure 19:
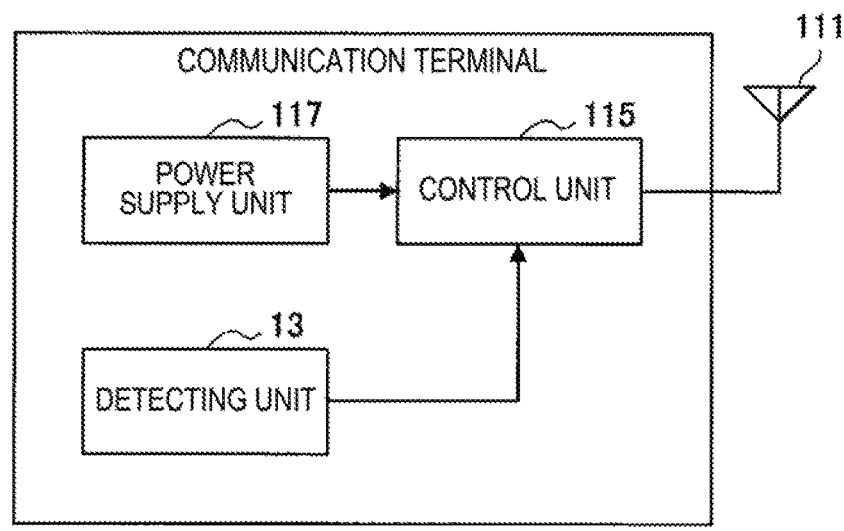
FIG. 19 is a block diagram illustrating an example of a functional configuration of a communication device according to the embodiment.

First, an example of a functional configuration of the communication device 10 according to the present embodiment will be described with reference to FIG. 19. FIG. 19 is a block diagram illustrating an example of a functional configuration of the communication device 10 according to the present embodiment.

As illustrated in FIG. 19, the communication device 10 according to the present embodiment includes an antenna 111, a detecting unit 13, a control unit 115, and a power supply unit 117. The antenna 111 illustrated in FIG. 19 corresponds to the antenna 111 illustrated in FIG. 18. Similarly, the detecting unit 13 illustrated in FIG. 19 corresponds to the detecting unit 13 illustrated in FIG. 18.

As described above, the detecting unit 13 detects the contact or the approach of the detection subject 33 installed on the mounting portion 391 of the mounting base 30. Then, when the contact or the approach of the detection subject 33 is detected, the detecting unit 13 notifies the control unit 115 of the detection result.

The power supply unit 117 is a power supply source, and supplies electric power to the control unit 115. The power supply unit 117 may be configured with, for example, a battery. The power supply unit 117 may supply electric power supplied from an external power source to the control unit 115.

The control unit 115 is a component for controlling an operation of the antenna 111. The control unit 115 is supplied with electric power from the power supply unit 117, and controls the transmission power of the antenna 111. The control unit 115 corresponds to, for example, the control unit 115 illustrated in FIG. 18.

The control unit 115 recognizes whether or not the communication device 10 is mounted or held on the mounting base 30 based on the detection result notified of from the detecting unit 13. As a specific example, when the detection subject 33 comes into contact with or comes close to the detecting unit 13, the control unit 115 recognizes that the communication device 10 is mounted or held on the mounting base 30 based on the detection result notified of from the detecting unit 13. Further, when the detection subject 33 does not come into contact with (does not come close to) the detecting unit 13, the control unit 115 recognizes that the communication device 10 is not mounted (held) on the mounting base 30.

Then, when the communication device 10 is recognized to be mounted or held on the mounting base 30, the control unit 115 controls the power supply amount to the antenna 111 or the operation of the antenna 111 such that the transmission power of the antenna 111 is increased.

Further, when the communication device 10 is recognized not to be mounted (held) on the mounting base 30, the control unit 115 controls the power supply amount to the antenna 111 or the operation of the antenna 111 such that the transmission power of the antenna 111 is restricted.

The example of the functional configuration of the communication device 10 according to the present embodiment has been described above with reference to FIG. 19.

2.3. Process

Figure 20:
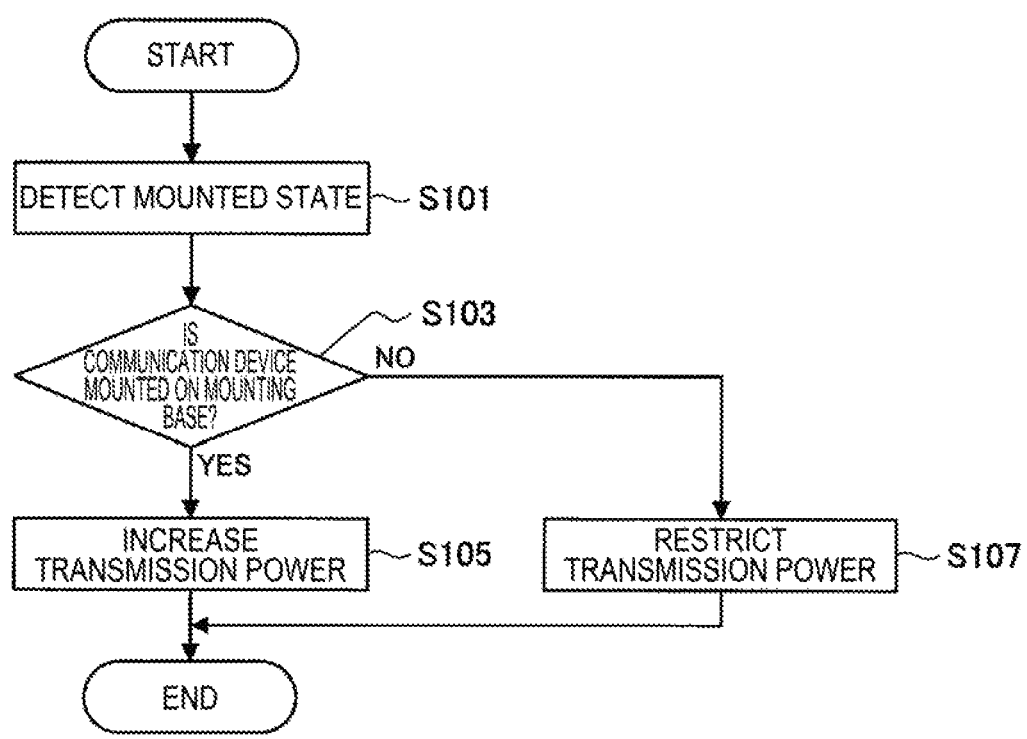
FIG. 20 is a flowchart illustrating an example of the flow of a series of processes of the communication device according to the embodiment.

Next, an example of the flow of a series of processes of the communication device 10 according to the present embodiment will be described with reference to FIG. 20, particularly, focusing on an operation related to control of the transmission power of the antenna 111. FIG. 20 is a flowchart illustrating an example of the flow of a series of processes of the communication device 10 according to the present embodiment.

(Step S101)

The detecting unit 13 detects the contact or the approach of the detection subject 33 installed on the mounting portion 391 of the mounting base 30. Then, when the contact or the approach of the detection subject 33 is detected, the detecting unit 13 notifies the control unit 115 of the detection result.

The control unit 115 recognizes whether or not the communication device 10 is mounted or held on the mounting base 30 based on the detection result notified of from the detecting unit 13. For example, when the detection subject 33 comes into contact with or comes close to the detecting unit 13, the control unit 115 recognizes that the communication device 10 is mounted or held on the mounting base 30 based on the detection result notified of from the detecting unit 13. Further, when the detection subject 33 does not come into contact with (does not come close to) the detecting unit 13, the control unit 115 recognizes that the communication device 10 is not mounted (held) on the mounting base 30.

(Step S105)

Then, when the communication device 10 is recognized to be mounted or held on the mounting base 30 (YES in Step S103), the control unit 115 controls the power supply amount to the antenna 111 or the operation of the antenna 111 such that the transmission power of the antenna 111 is increased.

(Step S107)

Further, when the communication device 10 is recognized not to be mounted (held) on the mounting base 30 (NO in Step S103), the control unit 115 controls the power supply amount to the antenna 111 or the operation of the antenna 111 such that the transmission power of the antenna 111 is restricted.

An example of the flow of a series of processes of the communication device 10 according to the present embodiment has been described with reference to FIG. 20, particularly, focusing on an operation related to control of the transmission power of the antenna 111.

2.4. Modified Examples

In the above-described embodiment, the example in which the communication device 10 recognizes whether or not the communication device 10 is mounted or held on the mounting base 30 by detecting the contact or the approach of the detection subject 33 installed on the mounting base 30 through the detecting unit 13 installed in the communication device 10 has been described. Meanwhile, a configuration through which the communication device 10 recognizes whether or not the communication device 10 is mounted or held on the mounting base 30 is not necessarily limited to the above example. In this regard, examples of a configuration by which the communication device 10 recognizes whether or not the communication device 10 is mounted or held on the mounting base 30 will be described below as modified examples of the present embodiment.

2.4.1. Modified Examples 2-1

Figure 21:
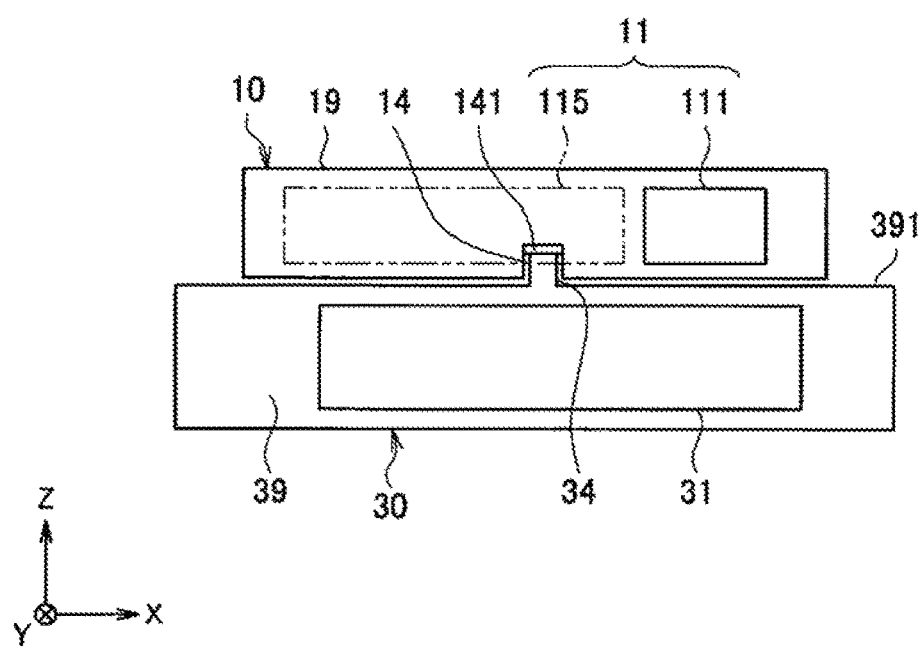
FIG. 21 is an explanatory diagram for describing an example of a schematic configuration of a communication system according to a modified example 2-1.

First, an example of the communication system according to the modified examples 2-1 will be described with reference to FIG. 21. FIG. 21 is an explanatory diagram for describing an example of a schematic configuration of the communication system according to the modified examples 2-1, and illustrates a schematic cross-sectional view of the communication device 10 and the mounting base 30 according to the modified examples 2-1. The present description will proceed focusing on a different configuration from the communication system according to the first embodiment described above with reference to FIG. 5, and a detailed description of a configuration similar to the communication system according to the first embodiment is omitted.

As illustrated in FIG. 21, in the communication device 10 according to the modified example 2-1, a concave portion 14 is formed in a part that comes into contact with or comes close to the mounting portion 391 of the mounting base 30 when the communication device 10 is mounted or held on the mounting base 30. In the concave portion 14, a switch 141 that performs switching between an ON state and an OFF state according to whether or not it is pushed down is installed. In the following description, the switch 141 is assumed to become the ON state when pushed down and become the OFF state when not pushed down.

Further, in the mounting base 30, a convex portion 34 configured to be able to engage with the concave portion 14 when the communication device 10 is mounted or held on the mounting base 30 is formed at a position on the mounting portion 391 facing the concave portion 14.

The switch 141 is in the OFF state in the state in which the communication device 10 is not mounted (held) on the mounting base 30. Further, when the communication device 10 is mounted or held on the mounting base 30, the convex portion 34 formed on the mounting portion 391 engages with the concave portion 14 formed on the communication device 10, and the switch 141 is pushed down by the convex portion 34, so that the switch 141 enters the ON state.

Using such a configuration, the communication device 10 according to the modified example 2-1 recognizes whether or not the communication device 10 is mounted or held on the mounting base 30 based on whether or not the switch 141 is in the ON state. In other words, in the modified example 2-1, the switch 141 corresponds to an example of the "detecting unit."

Accordingly, the communication device 10 according to the modified example 2-1 can control the transmission power of the antenna 111 according to whether or not the communication device 10 is mounted or held on the mounting base 30.

The example of the communication system according to the modified example 2-1 has been described above with reference to FIG. 21.

2.4.2. Modified Examples 2-2

Figure 22:
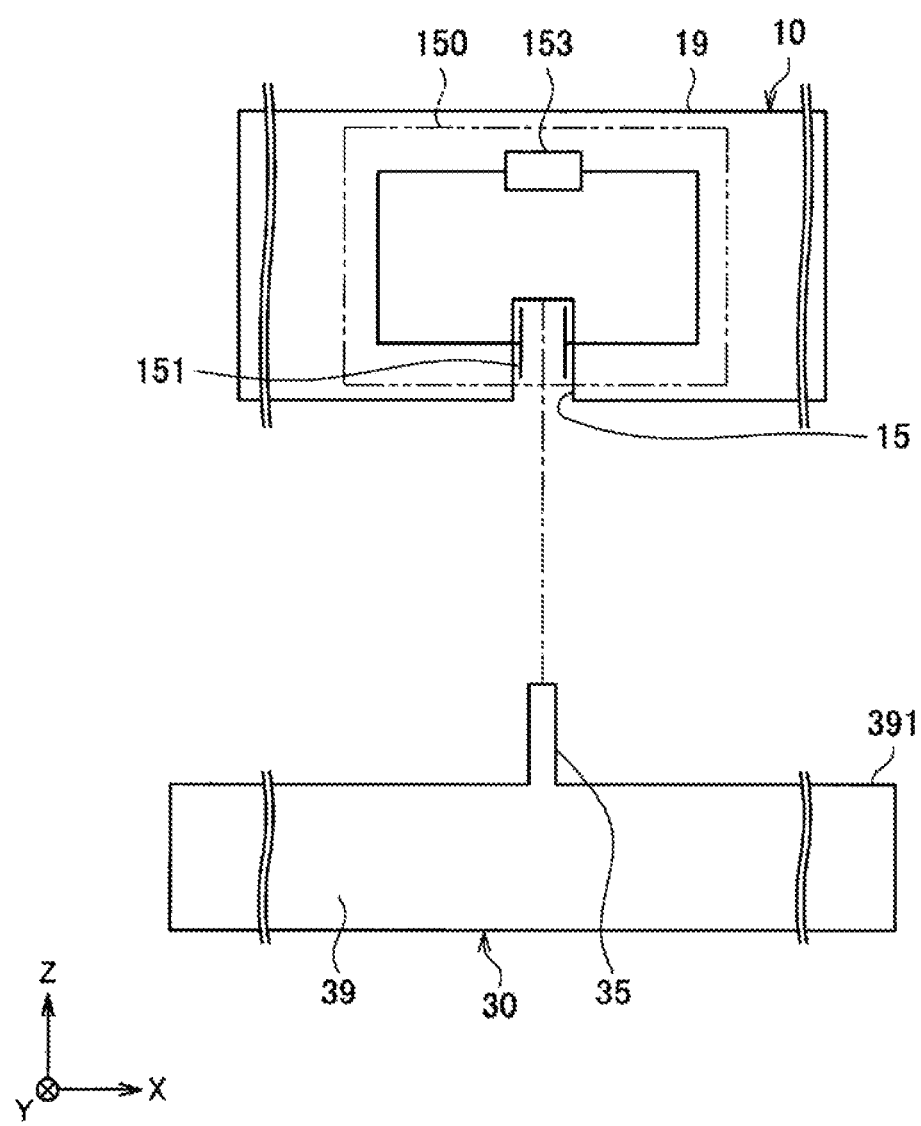
FIG. 22 is an explanatory diagram for describing an example of a schematic configuration of a communication system according to a modified example 2-2.
Figure 23:
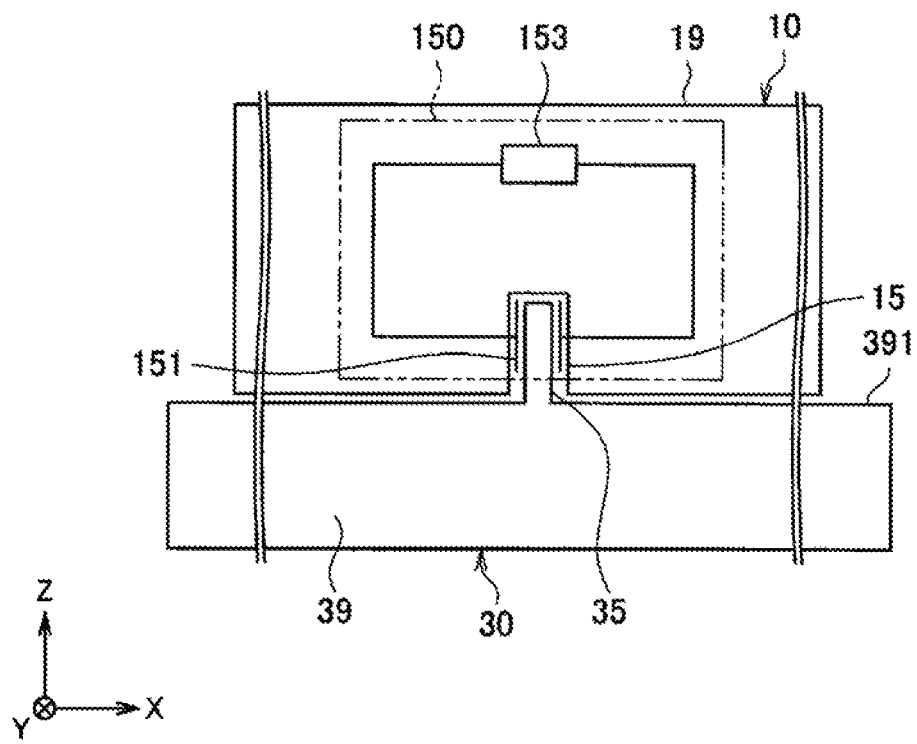
FIG. 23 is an explanatory diagram for describing an example of a schematic configuration of a communication system according to the modified example 2-2.

Next, an example of the communication system according to the modified examples 2-2 will be described with reference to FIG. 22 and FIG. 23. FIG. 22 and FIG. 23 is an explanatory diagram for describing an example of a schematic configuration of the communication system according to the modified examples 2-2, and illustrates a schematic cross-sectional view of the communication device 10 and the mounting base 30 according to the modified examples 2-2. The present description will proceed focusing on a different configuration from the communication system according to the first embodiment described above with reference to FIG. 5, and a detailed description of a configuration similar to the communication system according to the first embodiment is omitted.

As illustrated in FIG. 22, in the communication device 10 according to the modified example 2-2, a concave portion 15 is formed in a part that comes into contact with or comes close to the mounting portion 391 of the mounting base 30 when the communication device 10 is mounted or held on the mounting base 30. The communication device 10 according to the modified example 2-2 includes a capacitor 151 and a capacitive sensor 153 that detects a change in capacitance of the capacitor 151. The capacitor 151 is installed such that a pair of electrodes face each other inside the concave portion 15. In the modified example 2-2, a circuit group 150 including the capacitor 151 and the capacitive sensor 153 corresponds to an example of the "detecting unit."

In the mounting base 30, a convex portion 35 configured to be able to engage with the concave portion 15 when the communication device 10 is mounted or held on the mounting base 30 is formed at a position on the mounting portion 391 facing the concave portion 15. The convex portion 35 is made of a material having predetermined permittivity.

When the communication device 10 is mounted or held on the mounting base 30, the convex portion 35 formed on the mounting portion 391 engages with the concave portion 15 formed on the communication device 10, so that the convex portion 35 is inserted between the electrodes of the capacitor 151. Accordingly, the capacitance of the capacitor 151 changes, and the change in the capacitance is detected through the capacitive sensor 153.

Using such a configuration, the communication device 10 according to the modified example 2-2 recognizes whether or not the communication device 10 is mounted or held on the mounting base 30 based on the change in the capacitance of the capacitor 151 detected through the capacitive sensor 153.

Accordingly, the communication device 10 according to the modified example 2-2 can control the transmission power of the antenna 111 according to whether or not the communication device 10 is mounted or held on the mounting base 30.

2.5. Conclusion

As described above, the communication device 10 according to the present embodiment recognizes whether or not the communication device 10 is mounted or held on the mounting base 30, and controls the transmission power of the antenna 111 according to the recognized state. Accordingly, the communication device 10 restricts the transmission power of the antenna 111 in the state in which the communication device 10 can be worn on the human body, and increases the transmission power of the antenna 111 in the state in which the human body does not come close to the antenna 111 (in other words, state in which the communication device 10 is mounted or held on the mounting base 30), and thus the communication performance can be improved.

3. Third Embodiment

3.1. Overview

In the first embodiment, the mechanism in which the correcting unit 31 is installed in the mounting base 30, and corrects the antenna characteristic of the antenna 111 of the communication device 10 when the communication device 10 is mounted or held on the mounting base 30 has been described. In a third embodiment, a mechanism in which the antenna characteristic of the antenna 111 can be corrected even in the state in which the communication device 10 that is not worn on the human body is not mounted (held) on the mounting base 30 will be described.

3.2. Configuration

Figure 24:
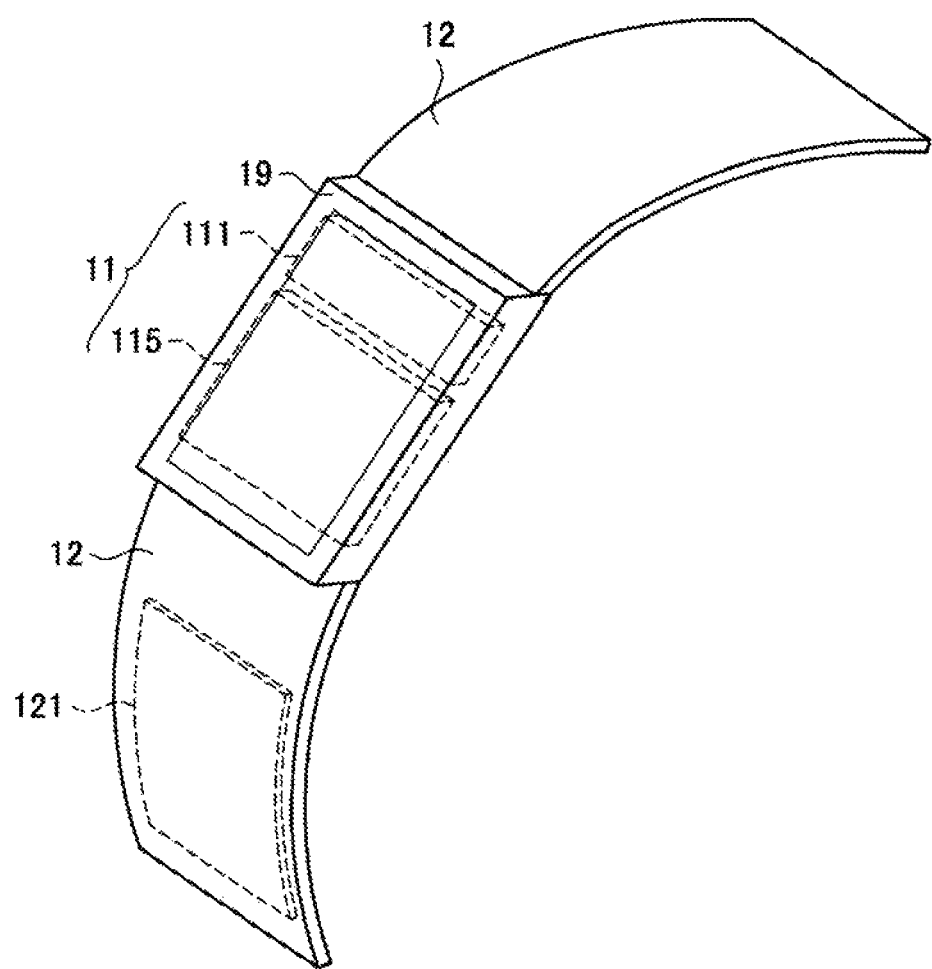
FIG. 24 is an explanatory diagram for describing an example of a schematic configuration of a communication device according to a third embodiment of the present disclosure.
Figure 25:
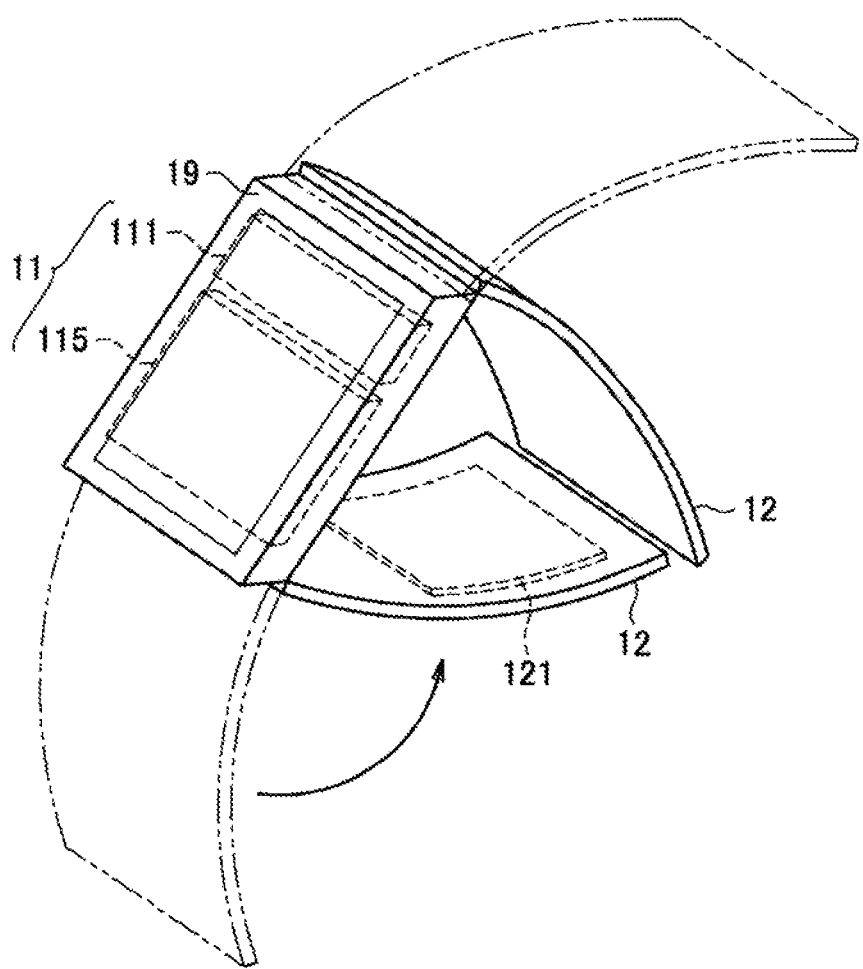
FIG. 25 is an explanatory diagram for describing an example of a schematic configuration of the communication device according to the embodiment.

An example of a configuration of a communication device 10 according to the present embodiment will be described with reference to FIGS. 24 and 25. FIGS. 24 and 25 are explanatory diagrams for describing an example of a configuration of the communication device 10 according to the present embodiment. The present description will proceed focusing on a different configuration from the communication device 10 according to the first embodiment described above with reference to FIG. 3, and a detailed description of a configuration similar to the communication device 10 according to the first embodiment is omitted.

As illustrated in FIG. 24, in the communication device 10 according to the present embodiment, the correcting unit 121 is installed in a part of the wearing portion 12. The correcting unit 121 may have a similar configuration to the correcting unit 31 according to the first embodiment. In other words, the correcting unit 121 may be configured to include, for example, a dielectric having relative permittivity that is predetermined based on the relative permittivity of the human body.

As another example, the correcting unit 121 may have a similar configuration to the correcting unit 31b according to the modified example 1. In other words, the correcting unit 121 may include a coupling element 313 configured as a so-called resonance circuit and a loading load 311 for adjusting the resonance condition of the coupling element 313.

The correcting unit 121 may be installed in the wearing portion 12 or may be attached to a part of the wearing portion 12.

As illustrated in FIG. 25, the wearing portion 12 is held on the device body 19 to be rotatable on a coupling portion with the device body 19. Through this configuration, as illustrated in FIG. 25, as the coupling portion of the wearing portion 12 and the device body 19 is bent, the correcting unit 121 installed in the wearing portion 1 comes close to the antenna 111 installed in the device body 19. In other words, it is desirable to adjust the position at which the correcting unit 121 is installed so that the antenna 111 and the correcting unit 121 come close to each other when the coupling portion of the wearing portion 12 and the device body 19 is bent. Further, the shapes of the wearing portion 12 and the device body 19 or a structure in which the coupling portion of the wearing portion 12 and the device body 19 is bent may be appropriately changed so that the communication device 10 is self-supported when the coupling portion of the wearing portion 12 and the device body 19 is bent as illustrated in FIG. 25.

Through the above-described configuration, as illustrated in FIG. 25, in the communication device 10 according to the present embodiment, when the coupling portion of the wearing portion 12 and the device body 19 is bent, and the antenna 111 and the correcting unit 121 come close to each other, the antenna characteristic of the antenna 111 is corrected through the correcting unit 121.

Further, the coupling portion of the wearing portion 12 and the device body 19 may be configured to be automatically bent so that the antenna 111 and the correcting unit 121 come close to each other when the communication device 10 is removed from the human body. As a specific example, preferably, the coupling portion of the wearing portion 12 and the device body 19 is configured with a hinge with a spring, and when the communication device 10 is removed from the human body, the hinge is rotated by elastic force of the spring, so that the coupling portion of the wearing portion 12 and the device body 19 is bent.

The antenna 111 and the correcting unit 121 may be brought to close to each other by bending the wearing portion 12 itself. As a specific example, the wearing portion 12 may be configured with an elastic member such as rubber. As another example, a joint for bending the wearing portion 12 may be installed in a part of the wearing portion 12. It will be appreciated that the wearing portion 12 is automatically bent so that the antenna 111 and the correcting unit 121 come close to each other when the communication device 10 is removed from the human body. As a specific example, the wearing portion 12 may be configured with an elastic member, and the wearing portion 12 may be bent by elastic force of the member when the communication device 10 is removed from the human body.

Further, when the communication device 10 according to the present embodiment is mounted or held on the mounting base 30, the correcting unit 121 installed in the wearing portion 12 need not necessarily come close to the antenna 111. For example, FIG. 26 is an explanatory diagram for describing an example of a schematic configuration of the communication device according to the present embodiment, and illustrates an example of a configuration when the communication device 10 according to the present embodiment is mounted or held on the mounting base 30 according to the first embodiment.

Figure 26:
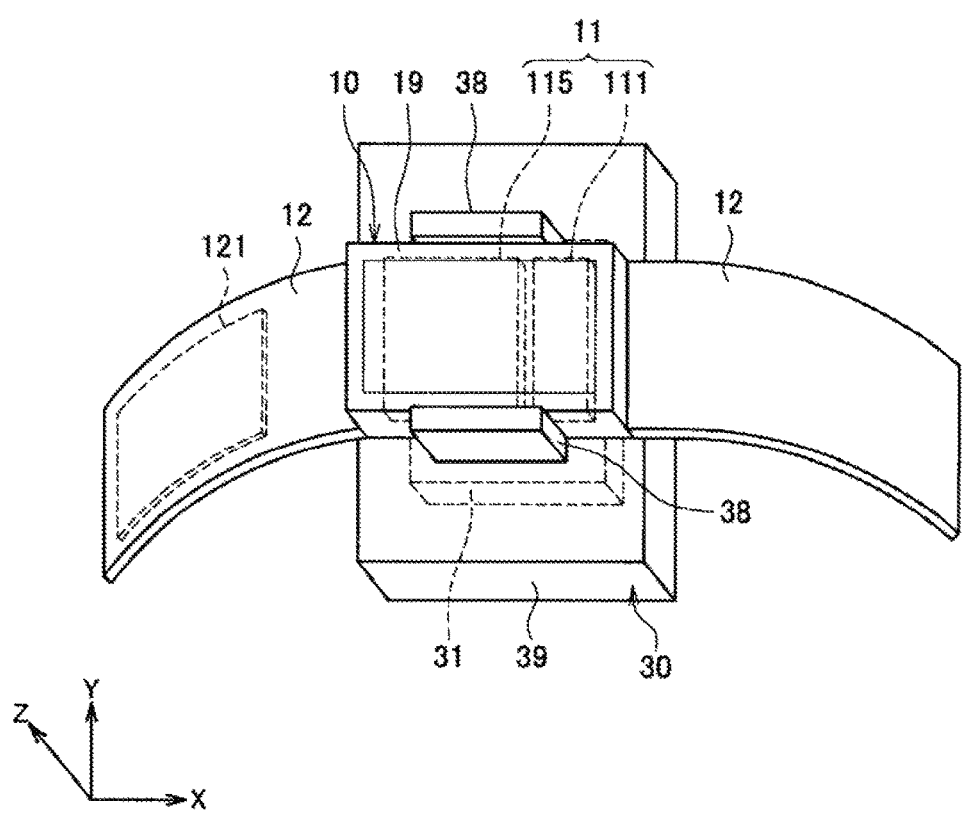
FIG. 26 is an explanatory diagram for describing an example of a schematic configuration of the communication device according to the embodiment.

As illustrated in FIG. 26, the correcting unit 121 installed in the wearing portion 12 and the antenna 111 need not necessarily come close to each other as long as the correcting unit 31 installed in the mounting base 30 comes close to the antenna 111 when the communication device 10 is mounted or held on the mounting base 30. In other words, the antenna characteristic of the antenna 111 can be corrected as long as either of the correcting unit 31 installed in the mounting base 30 and the correcting unit 121 installed in the wearing portion 12 comes close to the antenna 111 when the communication device 10 is not worn on the human body.

The present embodiment may be combined with the second embodiment, and in this case, when the communication device 10 is mounted or held on the mounting base 30, the transmission power of the antenna 111 may be increased to improve the communication performance.

The example of the configuration of the communication device 10 according to the present embodiment has been described above with reference to FIGS. 24 to 26.

3.3. Conclusion

As described above, in the communication device 10 according to the present embodiment, the correcting unit 121 is installed in the part of the wearing portion 12 that comes close to the antenna 111 when the coupling portion of the device body 19 and the wearing portion 12 or the wearing portion 12 itself is bent. Through this configuration, the communication device 10 corrects the antenna characteristic of the antenna 111 when the coupling portion of the device body 19 and the wearing portion 12 or the wearing portion 12 itself is bent, and the antenna 111 and the correcting unit 121 come close to each other. In other words, the communication device 10 according to the present embodiment can correct the antenna characteristic of the antenna 111 even in the state in which the communication device 10 is not mounted (held) on the mounting base 30.

4. Fourth Embodiment

4.1. Configuration

Next, an antenna characteristic correction member that is configured to be attachable to an object on which the communication device 10 can be mounted or held and corrects the antenna characteristic of the antenna 111 of the communication device 10 will be described as a fourth embodiment.

Figure 27:
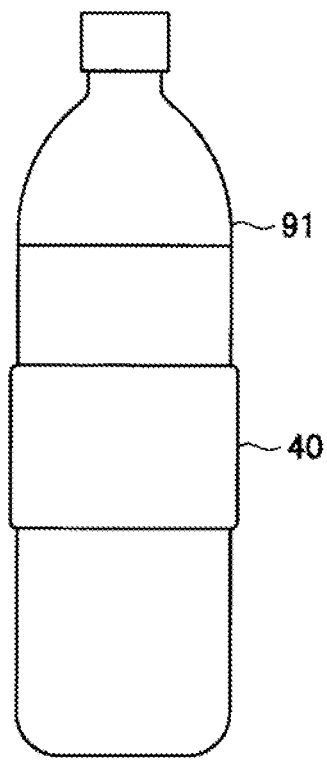
FIG. 27 is an explanatory diagram for describing a schematic configuration of a antenna characteristic correction member according to a fourth embodiment of the present disclosure.
Figure 28:
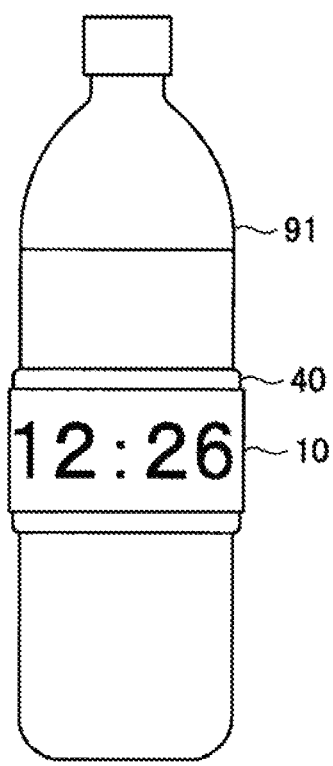
FIG. 28 is an explanatory diagram for describing an example of a schematic configuration of the antenna characteristic correction member according to the embodiment.

For example, FIGS. 27 and 28 are explanatory diagrams for describing an example of a schematic configuration of an antenna characteristic correction member 40 according to the present embodiment.

The antenna characteristic correction member 40 is formed in a film form, for example, by a flexible material such as resin or an elastic material such as rubber. The antenna characteristic correction member 40 is held on the object 91 such that it is wound along the side of a cylindrical object 91 such as a PET bottle so that one of film surfaces faces the side of the object 91. The antenna characteristic correction member 40 may be held on the side of the object 91 such that the film surface of the antenna characteristic correction member 40 is bonded to the side of the object 91 using an adhesive or the like. A part of the antenna characteristic correction member 40 in which the antenna characteristic correction member 40 is held on the side of the object 91 (for example, a bonded part) corresponds to an example of the "holding portion."

The antenna characteristic correction member 40 has a similar configuration to the correcting units 31 according to the above-described embodiments. For example, the antenna characteristic correction member 40 is configured such that at least the dielectric having the relative permittivity that is predetermined based on the relative permittivity of the human body is included in a part thereof.

As another example, the antenna characteristic correction member 40 may include the loading load 311 and the coupling element 313 according to the modified example 1. In this case, it is desirable that the loading load 311 and the coupling element 313 be installed so that a wiring pattern of the coupling element 313 is formed along the film surface of the antenna characteristic correction member 40 formed in the film form.

Through this configuration, the antenna characteristic correction member 40 corrects the antenna characteristic of the antenna that comes close thereto, similarly to the correcting units 31 according to the above-described embodiments. In other words, the side of the cylindrical object 91 illustrated in FIG. 27, a part on which the antenna characteristic correction member 40 is held simulates the human body. In the antenna characteristic correction member 40, a part having a similar configuration to the correcting unit 31 corresponds to an example of the "correcting unit" in the antenna characteristic correction member 40.

Accordingly, the antenna characteristic of the antenna 111 is corrected by holding the communication device 10 on the object 91 so that the communication device 10 comes into contact with or comes close to the position at which the antenna characteristic correction member 40 is held on the side of the cylindrical object 91.

For example, FIG. 28 illustrates an example in which the communication device 10 is configured as the wristwatch type wearable device illustrated in FIG. 3. In the example illustrated in FIG. 28, similarly to the case in which the communication device 10 is worn on the human body (the wrist), the communication device 10 is held on the object 91 by mounting the communication device 10 on the part in which the antenna characteristic correction member 40 is held on the side of the object 91.

The shape of the antenna characteristic correction member 40 is not limited to the film form as long as the antenna characteristic correction member 40 is held on the side of the object 91, and the communication device 10 is configured to be held at the position at which the antenna characteristic correction member 40 is held as illustrated in FIGS. 27 and 28.

For example, the antenna characteristic correction member 40 may be formed in an annular form using an elastic material such as rubber. In this case, the antenna characteristic correction member 40 is held on the side of the object 91 such that the inner surface of the annular ring faces the side of the object 91. The antenna characteristic correction member 40 may be held on the side of the object 91 such that the inner surface of the annular ring is bonded to the side of the object 91 using an adhesive or the like. As another example, the antenna characteristic correction member 40 may be held on the side of the object 91 such that the inner surface of the antenna characteristic correction member 40 grabs the side of the object 91 by elastic force of the antenna characteristic correction member 40.

By configuring the antenna characteristic correction member 40 as described above, for example, the existing object such as the PET bottle can have the function of correcting the antenna characteristic of the antenna 111, similarly to the mounting bases 30 according to the above-described embodiments.

4.2. Modified Examples

Next, modified examples of the antenna characteristic correction member 40 according to the present embodiment will be described. As described above, the existing object can be provided with the function of correcting the antenna characteristic of the antenna 111 by mounting the antenna characteristic correction member 40 according to the present embodiment on the object. Meanwhile, a material for forming the antenna characteristic correction member 40 or an aspect of the antenna characteristic correction member 40 such as the shape of the antenna characteristic correction member 40 may be appropriately changed according to the shape of the object on which the antenna characteristic correction member 40 is mounted. In this regard, another aspect of the antenna characteristic correction member 40 according to the present embodiment will be described below as modified examples.

4.2.1. Modified Example 4-1

Figure 29:
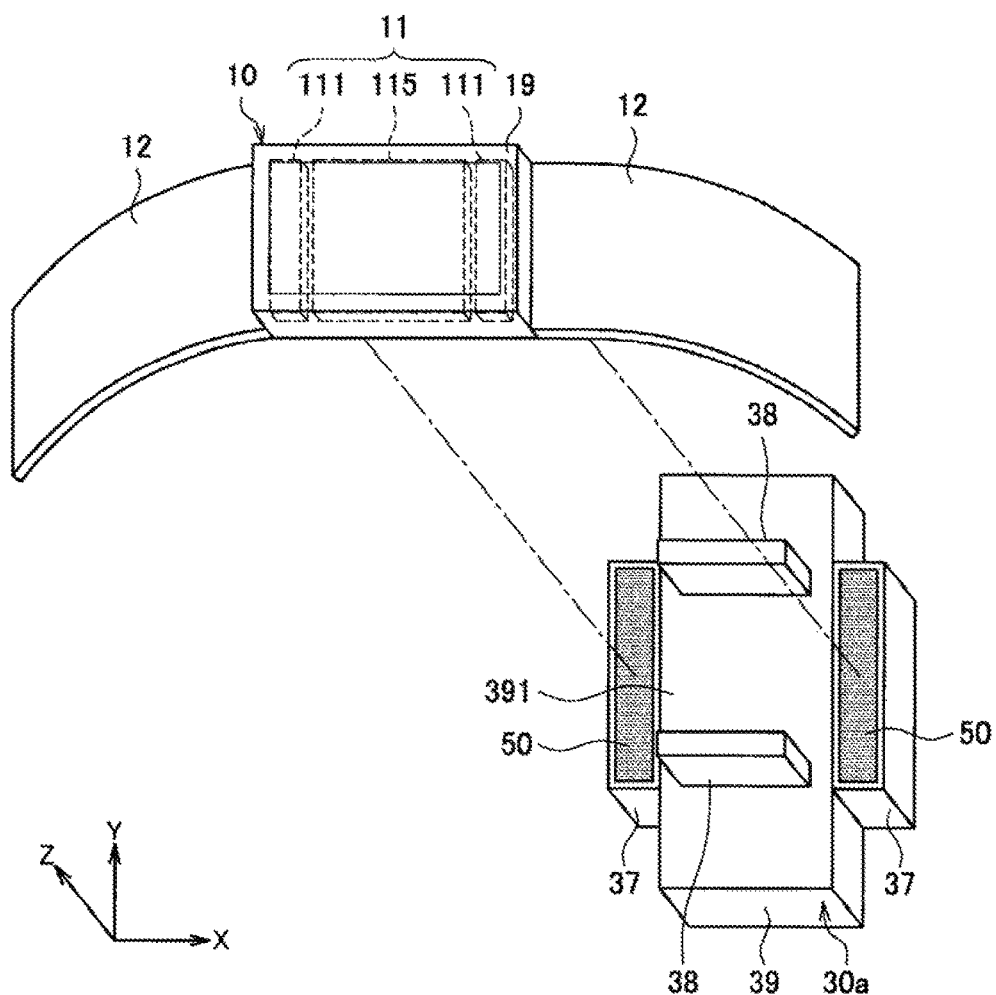
FIG. 29 is an explanatory diagram for describing an example of a schematic configuration of the antenna characteristic correction member according to a modified example 4-1.
Figure 30:
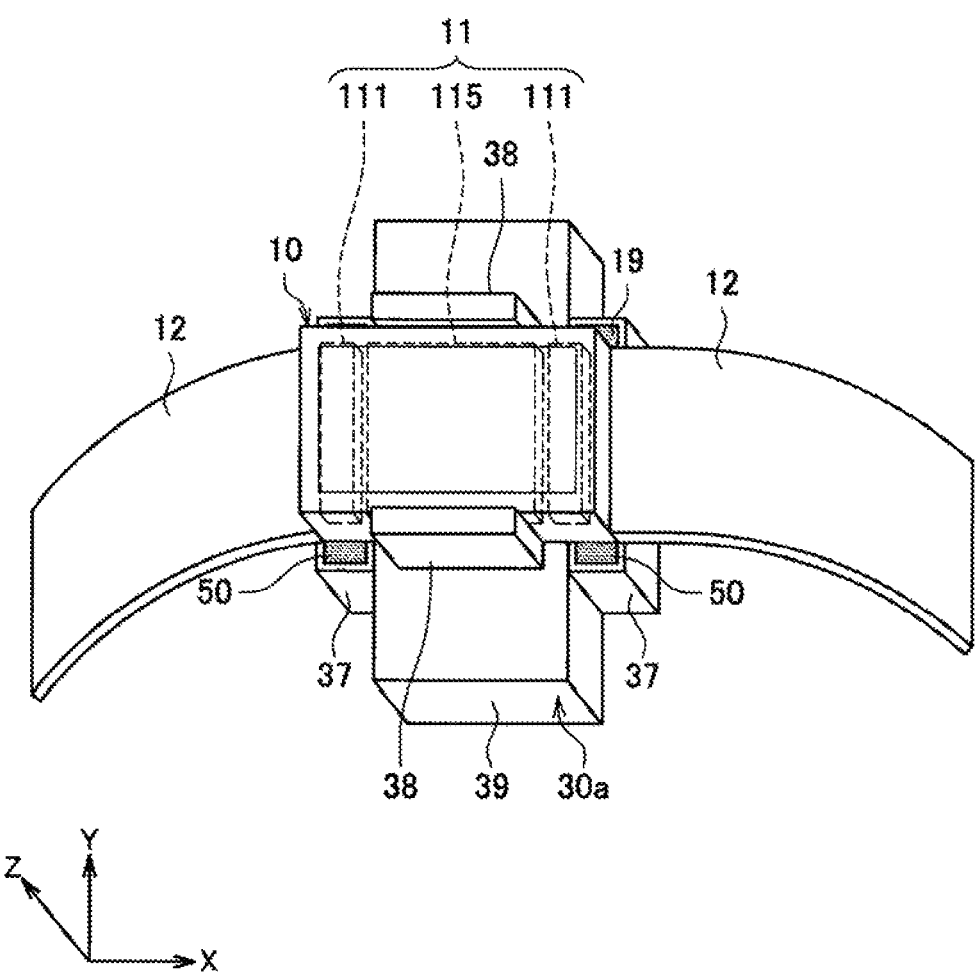
FIG. 30 is an explanatory diagram for describing an example of a schematic configuration of the antenna characteristic correction member according to the modified example 4-1.

First, an antenna characteristic correction member according to a modified example 4-1 will be described with reference to FIGS. 29 and 30. FIGS. 29 and 30 are explanatory diagrams for describing an example of a schematic configuration of the antenna characteristic correction member according to the modified example 4-1. Hereinafter, the antenna characteristic correction member according to the modified example 4-1 is also referred to as an "antenna characteristic correction member 50" when it is explicitly distinguished from the antenna characteristic correction member 40 according to the above embodiment.

The antenna characteristic correction member 50 according to the modified example 4-1 is configured to be mounted on the existing mounting base on which the communication device 10 is mounted or held.

For example, in FIGS. 29 and 30, a reference numeral 10 corresponds to the communication devices 10 according to the above embodiments. In other words, the communication device 10 includes a device body 19, a communication circuit 11, and a wearing portion 12. The communication circuit 11 includes an antenna 111 for performing wireless communication and a control unit 115 that controls an operation of the antenna 111. The device body 19, the communication circuit 11 (that is, the antenna 111 and the control unit 115), and the wearing portion 12 illustrated in FIGS. 29 and 30 are similar to the device body 19, the communication circuit 11, and the wearing portion 12 illustrated in FIGS. 3 and 4, and thus a detailed description thereof is omitted.

A reference numeral 30*a* indicates a mounting base on which the communication device 10 is mounted. As a specific example of the mounting base 30, there is a charging stand for supplying the communication device 10 (eventually, the battery) with electric power to charge a battery installed in the communication device 10.

In the example illustrated in FIGS. 29 and 30, a mounting base 30*a* includes a base 39, and the base 39 is provided with a mounting portion 391 on which the communication device 10 is mounted or held.

Further, in the base 39, a support portion 38 for supporting the communication device 10 so that the communication device 10 mounted or held on the base 39 comes into contact with or comes close to the mounting portion 391 may be formed. A configuration of the support portion 38 is similar to the support portion 38 described above with reference to FIGS. 3 and 4, and thus a detailed description thereof is omitted.

That is, in the example in FIG. 29 and FIG. 30, the communication device 10 and the mounting base 30*a* is configured so that a part of the device body 19 of the communication device 10 that comes into contact with or comes close to the human body comes into contact with or comes close to the mounting portion 391 when the communication device 10 is mounted or held on the mounting portion 391.

An auxiliary member 37 is attached to the base 39 of the mounting base 30*a* at a position to which the antenna 111 of the communication device 10 comes close when the communication device 10 is mounted or held on the mounting portion 391. The antenna characteristic correction member 50 is held on the auxiliary member 37 at a position which the communication device 10 mounted or held on the mounting portion 391 comes into contact with or comes close to.

The antenna characteristic correction member 50 may be configured to be removable from the auxiliary member 37. As a specific example, the antenna characteristic correction member 50 may be held on the auxiliary member 37 such that the antenna characteristic correction member 50 is bonded to the auxiliary member 37 using an adhesive or the like. As another example, the auxiliary member 37 may be configured to be removable from the base 39 of the mounting base 30*a*. It will be appreciated, the configuration for attaching or removing the auxiliary member 37 to or from the base 39 is not particularly limited. For example, the auxiliary member 37 may be held on the base 39 such that a pair of auxiliary members 37 grab the side of the base 39. As another example, the auxiliary member 37 may be held on the base 39 such that engagement portions may be formed at a position at which the base 39 and the auxiliary member 37 come into contact with each other, and the engagement portions engage with each other.

In FIGS. 29 and 30, for example, the existing mounting base may be used as the mounting base 30*a*, and the auxiliary member 37 provided as an accessory may be attached to the mounting base. In this case, since the auxiliary member 37 is attached to the mounting base 30*a*, the mounting base 30*a* can be provided with the function of correcting the antenna characteristic of the antenna 111.

As another example, the existing mounting base may be used as the mounting base 30*a* including the auxiliary member 37, and the antenna characteristic correction member 50 provided as an accessory may be attached to the auxiliary member 37 of the existing mounting base. In this case, since the antenna characteristic correction member 50 is attached to the auxiliary member 37, the mounting base 30*a* including the auxiliary member 37 can be provided with the function of correcting the antenna characteristic of the antenna 111.

As described above, the antenna characteristic correction member 50 may be attached to the existing mounting base on which the communication device 10 is mounted or held. Through this configuration, similarly to the mounting bases 30 according to the above-described embodiments, the existing mounting base can be provided with the function of correcting the antenna characteristic of the antenna 111 of the communication device 10 mounted or held on the mounting base.

4.2.2. Modified Example 4-2

Figure 31:
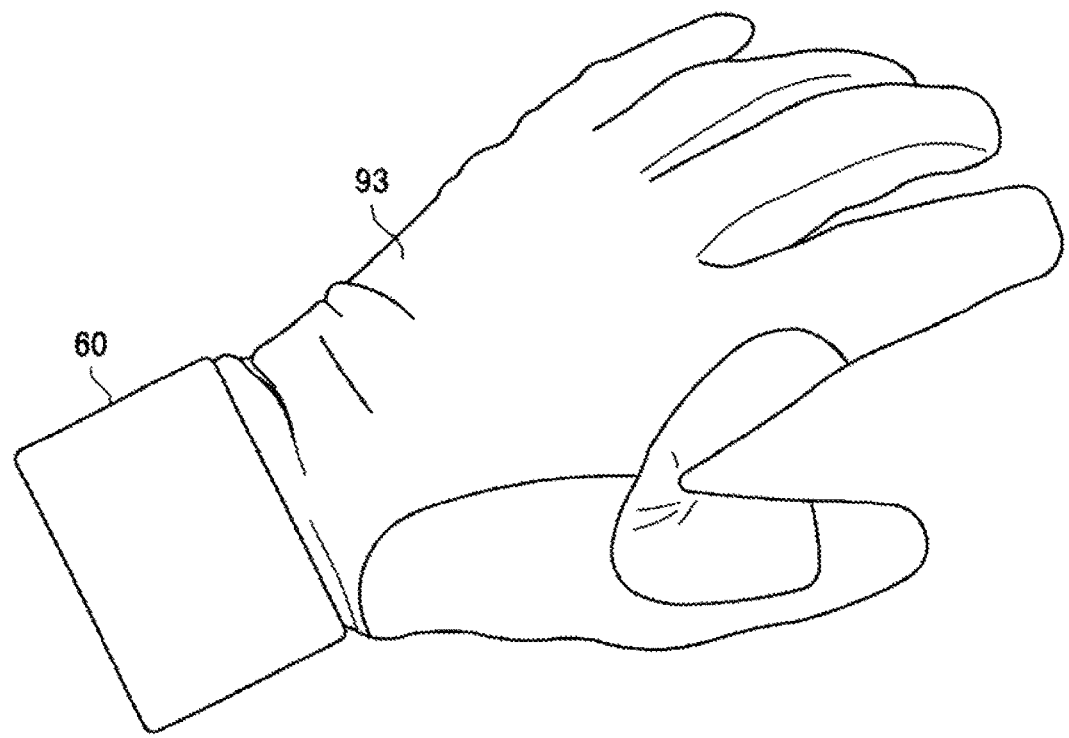
FIG. 31 is an explanatory diagram for describing an example of a schematic configuration of the antenna characteristic correction member according to a modified example 4-2.
Figure 32:
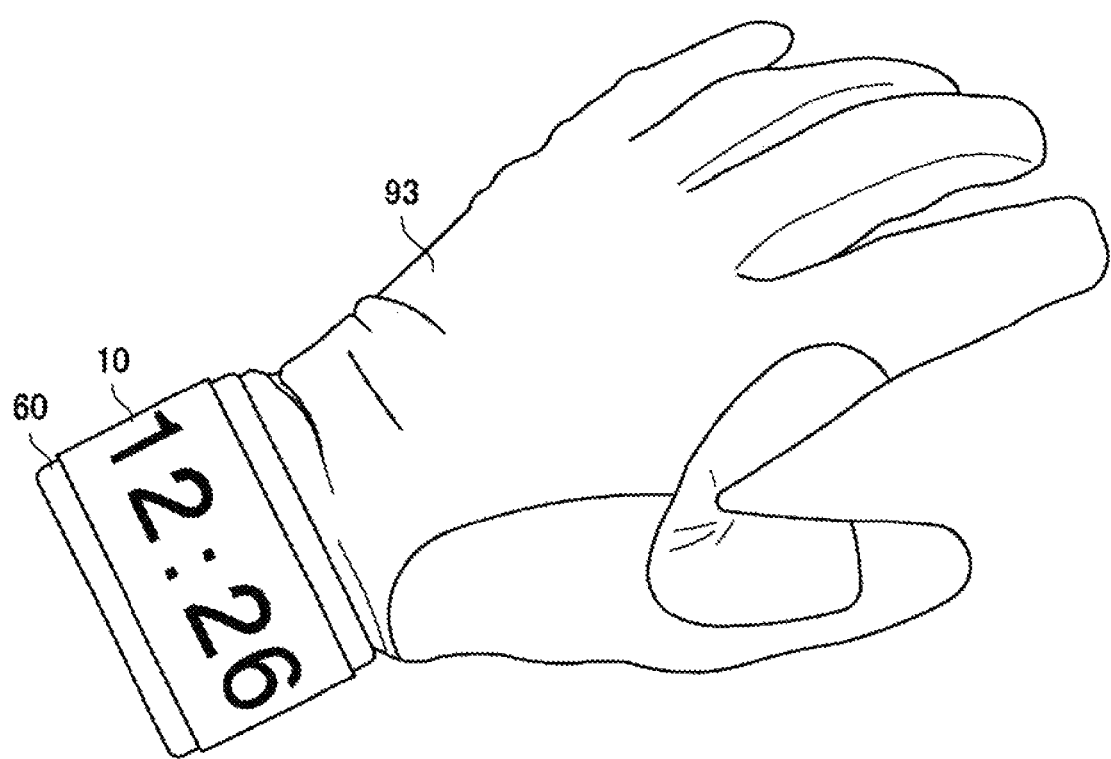
FIG. 32 is an explanatory diagram for describing an example of a schematic configuration of the antenna characteristic correction member according to the modified example 4-2.

Next, an antenna characteristic correction member according to a modified example 4-2 will be described with reference to FIGS. 31 and 32. FIGS. 31 and 32 are explanatory diagrams for describing an example of a schematic configuration of the antenna characteristic correction member according to the modified example 4-2. Hereinafter, the antenna characteristic correction member according to the modified example 4-1 is also referred to as an "antenna characteristic correction member 60" when it is explicitly distinguished from the antenna characteristic correction member 40 according to the above embodiment.

For example, when the user wears a glove 93, and the communication device 10 is mounted on the glove 93 as illustrated in FIG. 31 and FIG. 32, the glove 93 is interposed between the communication device 10 and the human body (the wrist), and the human body may have no influence on the antenna 111 of the communication device 10. In this case, the communication device 10 can become the same state when the communication device 10 is not worn on the human body.

For this reason, for example, when the antenna characteristic of the antenna 111 of the communication device 10 is optimized for the time of wearing on the human body, if the communication device 10 is worn on the glove 93, there are cases in which the antenna characteristic of the antenna 111 deteriorates, and performance is not sufficiently exhibited.

In this regard, in the example illustrated in FIGS. 31 and 32, an antenna characteristic correction member 60 is held on a position on the glove 93 on which the communication device 10 can be worn. The antenna characteristic correction member 60 may be formed, for example, a film form like the antenna characteristic correction member 40 according to the above-described embodiment and attached to the position of the glove 93 corresponding to the wrist. As another example, the wrist part of the glove 93 may be configured with the antenna characteristic correction member 60, and the antenna characteristic correction member 60 may be configured integrally with the glove 93.

Through this configuration, the antenna characteristic correction member 60 corrects the antenna characteristic of the antenna that comes close thereto, similarly to the correcting units 31 according to the above-described embodiments. In other words, the part of the glove 93 of FIG. 31 on which the antenna characteristic correction member 60 is held simulates the human body.

Accordingly, even when the user wears the glove 93, and the communication device 10 is worn on the glove 93 as illustrated in FIG. 32, the antenna characteristic of the antenna 111 of the communication device 10 is corrected through the antenna characteristic correction member 60.

In other words, the antenna characteristic correction member 60 is held on the position on the glove 93 on which the communication device 10 can be mounted, and thus the glove 93 can be provided with the function of correcting the antenna characteristic of the antenna 111 of the communication device 10.

It will be appreciated that a target on which the antenna characteristic correction member 60 is held is not necessarily limited to the glove. As a specific example, the antenna characteristic correction member 60 may be held on a position at which the communication device 10 can be mounted in things that user wear such as a wrist band or clothing (that is, a position which the communication device 10 comes into contact with or comes close to).

4.3. Conclusion

As described above, the antenna characteristic correction member of the present embodiment has a similar configuration as the correcting units 31 according to the above-described embodiments and is configured to be attachable to the object on which the communication device 10 is mounted or held. Through this configuration, the existing object on which the communication device 10 is mounted or held can be provided with the function of correcting the antenna characteristic of the antenna 111, similarly to the mounting bases 30 according to the above-described embodiments.

5. Conclusion

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A mounting base including:

a mounting portion on which a communication device is mounted or held in a manner that the communication device comes into contact with or comes close to the mounting portion, the communication device including an antenna and being worn on a human body; and a correcting unit configured to correct an antenna characteristic of the antenna of the communication device, the correcting unit being installed in a manner that the communication device mounted or held on the mounting portion comes into contact with or comes close to the correcting unit.

(2)

The mounting base according to (1), wherein the correcting unit includes a dielectric having relative permittivity that is predetermined based on relative permittivity of the human body.

(3)

The mounting base according to (1), wherein the correcting unit includes a correcting circuit that corrects an impedance characteristic of the antenna.

(4)

The mounting base according to (3), wherein the correcting circuit includes a coupling element configured to perform antenna coupling with the antenna, and a loading load configured to resonate with a predetermined frequency.

(5)

The mounting base according to any one of (1) to (4), wherein the correcting unit shifts the frequency characteristic of the antenna to a low frequency side.

(6)

A communication device, including:
a device body configured to include an antenna; and
a wearing portion configured to cause the device body to be worn on a human body,
wherein, when the device body is mounted or held on a mounting base provided with a correcting unit configured to correct an antenna characteristic of the antenna, a contact portion that comes into contact with the human body or an approach portion that comes close to the human body at a time of wearing on the human body comes into contact with or comes close to the correcting unit.

(7)

The communication device according to (6), including:
a detecting unit configured to detect contact or approach between the contact portion or the approach portion and the mounting base; and
a control unit configured to control transmission power of the antenna according to a detection result.

(8)

The communication device according to (7),
wherein the control unit increases the transmission power of the antenna when the contact or the approach between the contact portion or the approach portion and the mounting base is detected.

(9)

The communication device according to (7) or (8),
wherein the detecting unit includes a sensor configured to detect contact or approach of a detection subject formed in the mounting base.

(10)

The communication device according to (7) or (8),
wherein the detecting unit includes
an engagement portion configured to engage with a member formed in the mounting base, and
a switch configured to perform switching between an ON state and an OFF state by the member engaging with the engagement portion, and
the control unit controls the transmission power of the antenna according to the switching of the switch.

(11)

The communication device according to (7) or (8),
wherein the device body includes a concave portion configured to engage with a convex portion having predetermined permittivity, the concave portion being formed in the contact portion or the approach portion, the convex portion being formed in the mounting base,
the detecting unit includes
a capacitor configured to include a pair of electrodes formed to face an inner surface of the concave portion, and
a sensor configured to detect a change in capacitance of the capacitor, and
the control unit controls the transmission power of the antenna based on the change in the capacitance of the capacitor detected by the sensor when the convex portion is inserted between the electrodes of the capacitor with engagement of the concave portion and the convex portion.

(12)

The communication device according to any one of (7) to (11),
wherein the wearing portion includes a correcting unit configured to correct the antenna characteristic of the antenna and configured to come close to the contact portion or the approach portion when a coupling portion of the device body and the wearing portion or the wearing portion itself is bent.

(13)

An antenna characteristic correction member, including:
a correcting unit configured to correct an antenna characteristic of a communication device that includes an antenna and is worn on a human body; and
a holding portion configured to hold the correcting unit on an object in a manner that the correcting unit and the communication device mounted or held on the object comes into contact with or comes close to each other.

(14)

A communication system, including:
a communication device that includes a device body configured to include an antenna and a wearing portion configured to cause the device body to be worn on a human body; and
a mounting base that includes a mounting portion on which the communication device is mounted or held in a manner that the communication device comes into contact with or comes close to the mounting portion, and a correcting unit configured to correct an antenna characteristic of the antenna of the communication device, the correcting unit being installed in a manner that the communication device mounted or held on the mounting portion comes into contact with or comes close to the correcting unit.

REFERENCE SIGNS LIST 10 communication device
11 communication circuit
111 antenna
113 power supply point
115 control unit
117 power supply unit
12 wearing portion
121 correcting unit
13 detecting unit
14 concave portion
141 switch
15 concave portion
151 capacitor
153 capacitive sensor
19 device body
30 mounting base
31 correcting unit
311 loading load
313 coupling element
33 detection subject
34 convex portion
35 convex portion
37 auxiliary member
38 support portion
39 base
391 mounting portion
40, 50, 60 antenna characteristic correction member

The invention claimed is:
1. A mounting base, comprising:
a mounting portion on which a communication device is mounted or held in a manner that the communication device comes into contact with or comes close to the mounting portion, the communication device including an antenna and being worn on a human body; and a correcting unit configured to correct an antenna characteristic of an antenna of the communication device, the correcting unit being installed in a manner that the communication device mounted or held on the mounting portion comes into contact with or comes close to the correcting unit;
the communication device including
a device body configured to include the antenna,
a wearing portion configured to cause the device body to be worn on the human body, wherein, when the device body is mounted or held on the mounting base provided with the correcting unit configured to correct the antenna characteristic of the antenna,
a contact portion that comes into contact with the human body or an approach portion that comes close to the human body at a time of wearing on the human body comes into contact with or comes close to the correcting unit,
a detecting unit configured to detect contact or approach between the contact portion or the approach portion and the mounting base, and
a control unit configured to control transmission power of the antenna according to a detection result,
wherein the detecting unit includes
an engagement portion configured to engage with a member formed in the mounting base, and
a switch configured to perform switching between an ON state and an OFF state by the member engaging with the engagement portion, and
the control unit controls the transmission power of the antenna according to the switching of the switch.

2. The mounting base according to claim 1, wherein the correcting unit includes a dielectric having relative permittivity that is predetermined based on relative permittivity of the human body.

3. The mounting base according to claim 1, wherein the correcting unit includes a correcting circuit that corrects an impedance characteristic of the antenna.

4. The mounting base according to claim 3, wherein the correcting circuit includes a coupling element configured to perform antenna coupling with the antenna, a loading load configured to resonate with a predetermined frequency.

5. The mounting base according to claim 1, wherein the correcting unit shifts the frequency characteristic of the antenna to a low frequency side.

6. A communication device, comprising:
a device body configured to include an antenna; and
a wearing portion configured to cause the device body to be worn on a human body, wherein, when the device body is mounted or held on a mounting base provided with a
correcting unit configured to correct an antenna characteristic of the antenna, a contact portion that comes into contact with the human body or an approach portion that comes close to the human body at a time of wearing on the human body comes into contact with or comes close to the correcting unit;
wherein the communication device further comprises
a detecting unit configured to detect contact or approach between the contact portion or the approach portion and the mounting base,
a control unit configured to control transmission power of the antenna according to a detection result;
the detecting unit further including
an engagement portion configured to engage with a member formed in the mounting base, and
a switch configured to perform switching between an ON state and an OFF state by the member engaging with the engagement portion; and
the control unit controls the transmission power of the antenna according to the switching of the switch.

7. The communication device according to claim 6, wherein the control unit increases the transmission power of the antenna when the contact or the approach between the contact portion or the approach portion and the mounting base is detected.

8. The communication device according to claim 6, wherein the detecting unit includes a sensor configured to detect contact or approach of a detection subject formed in the mounting base.

9. The communication device according to claim 6,
wherein the device body includes a concave portion configured to engage with a convex portion having predetermined permittivity, the concave portion being formed in the contact portion or the approach portion, the convex portion being formed in the mounting base,
the detecting unit includes
a capacitor configured to include a pair of electrodes formed to face an inner surface of the concave portion, and
a sensor configured to detect a change in capacitance of the capacitor, and
the control unit controls the transmission power of the antenna based on the change in the capacitance of the capacitor detected by the sensor when the convex portion is inserted between the electrodes of the capacitor with engagement of the concave portion and the convex portion.

10. The communication device according to claim 6, wherein the wearing portion includes the correcting unit configured to correct the antenna characteristic of the antenna and configured to come close to the contact portion or the approach portion when a coupling portion of the device body and the wearing portion or the wearing portion itself is bent.

11. An antenna characteristic correction member, comprising:
a correcting unit configured to correct an antenna characteristic of a communication device that includes an antenna and is worn on a human body; and
a holding portion configured to hold the correcting unit on an object in a manner that the correcting unit and the communication device mounted or held on the object comes into contact with or comes close to each other;
the communication device including
a device body configured to include the antenna,
a wearing portion configured to cause the device body to be worn on the human body, wherein, when the device body is mounted or held on the mounting base provided with the correcting unit configured to correct the antenna characteristic of the antenna,
a contact portion that comes into contact with the human body or an approach portion that comes close to the human body at a time of wearing on the human body comes into contact with or comes close to the correcting unit,
a detecting unit configured to detect contact or approach between the contact portion or the approach portion and the mounting base, and
a control unit configured to control transmission power of the antenna according to a detection result,
wherein the detecting unit includes an engagement portion configured to engage with a member formed in the mounting base, and
a switch configured to perform switching between an ON state and an OFF state by the member engaging with the engagement portion, and
the control unit controls the transmission power of the antenna according to the switching of the switch.

12. A communication system, comprising:
a communication device that includes a device body configured to include an antenna and a wearing portion configured to cause the device body to be worn on a human body; and
a mounting base that includes a mounting portion on which the communication device is mounted or held in a manner that the communication device comes into contact with or comes close to the mounting portion, and a correcting unit configured to correct an antenna characteristic of the antenna of the communication device, the correcting unit being installed in a manner that the communication device mounted or held on the mounting portion comes into contact with or comes close to the correcting unit;
the communication device including
a device body configured to include the antenna,
a wearing portion configured to cause the device body to be worn on the human body, wherein, when the device body is mounted or held on the mounting base provided with the correcting unit configured to correct the antenna characteristic of the antenna,
a contact portion that comes into contact with the human body or an approach portion that comes close to the human body at a time of wearing on the human body comes into contact with or comes close to the correcting unit,
a detecting unit configured to detect contact or approach between the contact portion or the approach portion and the mounting base, and
a control unit configured to control transmission power of the antenna according to a detection result,
wherein the detecting unit includes
an engagement portion configured to engage with a member formed in the mounting base, and
a switch configured to perform switching between an ON state and an OFF state by the member engaging with the engagement portion, and
the control unit controls the transmission power of the antenna according to the switching of the switch.

13. A mounting base, comprising:
a mounting portion on which a communication device is mounted or held in a manner that the communication device comes into contact with or comes close to the mounting portion, the communication device including an antenna and being worn on a human body; and
a correcting unit configured to correct an antenna characteristic of an antenna of the communication device, the correcting unit being installed in a manner that the communication device mounted or held on the mounting portion comes into contact with or comes close to the correcting unit;
the communication device including
a device body configured to include the antenna,
a wearing portion configured to cause the device body to be worn on the human body, wherein, when the device body is mounted or held on the mounting base provided with the correcting unit configured to correct the antenna characteristic of the antenna,
a contact portion that comes into contact with the human body or an approach portion that comes close to the human body at a time of wearing on the human body comes into contact with or comes close to the correcting unit,
a detecting unit configured to detect contact or approach between the contact portion or the approach portion and the mounting base, and
a control unit configured to control transmission power of the antenna according to a detection result,
wherein the device body includes a concave portion configured to engage with a convex portion having predetermined permittivity, the concave portion being formed in the contact portion or the approach portion, the convex portion being formed in the mounting base,
the detecting unit includes
a capacitor configured to include a pair of electrodes formed to face an inner surface of the concave portion, and
a sensor configured to detect a change in capacitance of the capacitor, and
the control unit controls the transmission power of the antenna based on the change in the capacitance of the capacitor detected by the sensor when the convex portion is inserted between the electrodes of the capacitor with engagement of the concave portion and the convex portion.

14. The mounting base according to claim 13, wherein the correcting unit includes a dielectric having relative permittivity that is predetermined based on relative permittivity of the human body.

15. The mounting base according to claim 13, wherein the correcting unit includes a correcting circuit that corrects an impedance characteristic of the antenna.

16. The mounting base according to claim 15, wherein the correcting circuit includes a coupling element configured to perform antenna coupling with the antenna, a loading load configured to resonate with a predetermined frequency.

17. The mounting base according to claim 13, wherein the correcting unit shifts the frequency characteristic of the antenna to a low frequency side.

18. A communication device, comprising:
a device body configured to include an antenna; and
a wearing portion configured to cause the device body to be worn on a human body, wherein, when the device body is mounted or held on a mounting base provided with a
correcting unit configured to correct an antenna characteristic of the antenna, a contact portion that comes into contact with the human body or an approach portion that comes close to the human body at a time of wearing on the human body comes into contact with or comes close to the correcting unit;
wherein the communication device further comprises
a detecting unit configured to detect contact or approach between the contact portion or the approach portion and the mounting base,
a control unit configured to control transmission power of the antenna according to a detection result,
wherein the device body includes a concave portion configured to engage with a convex portion having predetermined permittivity, the concave portion being formed in the contact portion or the approach portion, the convex portion being formed in the mounting base,
the detecting unit includes a capacitor configured to include a pair of electrodes formed to face an inner surface of the concave portion, and a sensor configured to detect a change in capacitance of the capacitor, and the control unit controls the transmission power of the antenna based on the change in the capacitance of the capacitor detected by the sensor when the convex portion is inserted between the electrodes of the capacitor with engagement of the concave portion and the convex portion.

19. The communication device according to claim 18, wherein the control unit increases the transmission power of the antenna when the contact or the approach between the contact portion or the approach portion and the mounting base is detected.

20. The communication device according to claim 18, wherein the detecting unit includes a sensor configured to detect contact or approach of a detection subject formed in the mounting base.

21. The communication device according to claim 18, wherein the wearing portion includes the correcting unit configured to correct the antenna characteristic of the antenna and configured to come close to the contact portion or the approach portion when a coupling portion of the device body and the wearing portion or the wearing portion itself is bent.

22. An antenna characteristic correction member, comprising:

a correcting unit configured to correct an antenna characteristic of a communication device that includes an antenna and is worn on a human body; and a holding portion configured to hold the correcting unit on an object in a manner that the correcting unit and the communication device mounted or held on the object comes into contact with or comes close to each other;

the communication device including
a device body configured to include the antenna,
a wearing portion configured to cause the device body to be worn on the human body, wherein, when the device body is mounted or held on the mounting base provided with the correcting unit configured to correct the antenna characteristic of the antenna,
a contact portion that comes into contact with the human body or an approach portion that comes close to the human body at a time of wearing on the human body comes into contact with or comes close to the correcting unit,
a detecting unit configured to detect contact or approach between the contact portion or the approach portion and the mounting base, and
a control unit configured to control transmission power of the antenna according to a detection result,
wherein the device body includes a concave portion configured to engage with a convex portion having predetermined permittivity, the concave portion being formed in the contact portion or the approach portion, the convex portion being formed in the mounting base,
the detecting unit includes
a capacitor configured to include a pair of electrodes formed to face an inner surface of the concave portion, and
a sensor configured to detect a change in capacitance of the capacitor, and
the control unit controls the transmission power of the antenna based on the change in the capacitance of the capacitor detected by the sensor when the convex portion is inserted between the electrodes of the capacitor with engagement of the concave portion and the convex portion.

23. A communication system, comprising:
a communication device that includes a device body configured to include an antenna and a wearing portion configured to cause the device body to be worn on a human body; and
a mounting base that includes a mounting portion on which the communication device is mounted or held in a manner that the communication device comes into contact with or comes close to the mounting portion, and a correcting unit configured to correct an antenna characteristic of the antenna of the communication device, the correcting unit being installed in a manner that the communication device mounted or held on the mounting portion comes into contact with or comes close to the correcting unit;
the communication device including
a device body configured to include the antenna,
a wearing portion configured to cause the device body to be worn on the human body, wherein, when the device body is mounted or held on the mounting base provided with the correcting unit configured to correct the antenna characteristic of the antenna,
a contact portion that comes into contact with the human body or an approach portion that comes close to the human body at a time of wearing on the human body comes into contact with or comes close to the correcting unit,
a detecting unit configured to detect contact or approach between the contact portion or the approach portion and the mounting base, and
a control unit configured to control transmission power of the antenna according to a detection result,
wherein the device body includes a concave portion configured to engage with a convex portion having predetermined permittivity, the concave portion being formed in the contact portion or the approach portion, the convex portion being formed in the mounting base,
the detecting unit includes
a capacitor configured to include a pair of electrodes formed to face an inner surface of the concave portion, and
a sensor configured to detect a change in capacitance of the capacitor, and
the control unit controls the transmission power of the antenna based on the change in the capacitance of the capacitor detected by the sensor when the convex portion is inserted between the electrodes of the capacitor with engagement of the concave portion and the convex portion.

* * * * *